United States Patent
Tsuda et al.

(10) Patent No.: US 10,559,787 B2
(45) Date of Patent: Feb. 11, 2020

(54) ELECTROLYTE, BATTERY, BATTERY PACK, ELECTRONIC APPARATUS, ELECTRIC VEHICLE, POWER STORAGE APPARATUS, AND POWER SYSTEM

(71) Applicant: Murata Manufacturing Co., Ltd., Kyoto (JP)

(72) Inventors: Ryohei Tsuda, Kanagawa (JP); Toru Odani, Kanagawa (JP); Tadahiko Kubota, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/547,698

(22) PCT Filed: Jan. 22, 2016

(86) PCT No.: PCT/JP2016/000314
§ 371 (c)(1),
(2) Date: Jul. 31, 2017

(87) PCT Pub. No.: WO2016/132675
PCT Pub. Date: Aug. 25, 2016

(65) Prior Publication Data
US 2018/0034011 A1    Feb. 1, 2018

(30) Foreign Application Priority Data

Feb. 20, 2015    (JP) .................. 2015-031305

(51) Int. Cl.
*H01M 2/10*    (2006.01)
*H01M 10/0567*    (2010.01)
(Continued)

(52) U.S. Cl.
CPC ............ *H01M 2/10* (2013.01); *H01M 4/587* (2013.01); *H01M 10/052* (2013.01);
(Continued)

(58) Field of Classification Search
CPC .. H01M 2/10; H01M 10/052; H01M 10/0567; H01M 10/0568; H01M 10/0569; H01M 10/44; H01M 10/4235
See application file for complete search history.

(56) References Cited

U.S. PATENT DOCUMENTS

| | | | |
|---|---|---|---|
| 2011/0223476 A1 | 9/2011 | Kobayashi et al. | |
| 2013/0034759 A1* | 2/2013 | Funada | H01M 10/0525 429/90 |

(Continued)

FOREIGN PATENT DOCUMENTS

| | | |
|---|---|---|
| CN | 102916223 A | 2/2013 |
| CN | 103354962 A | 10/2013 |

(Continued)

OTHER PUBLICATIONS

International Search Report and Written Opinion of PCT Application No. PCT/JP2016/000314, dated Apr. 12, 2016, 02 pages of English Translation and 08 pages of ISRWO.
(Continued)

*Primary Examiner* — Osei K Amponsah
(74) *Attorney, Agent, or Firm* — Chip Law Group

(57) ABSTRACT

A battery includes a positive electrode, a negative electrode, and an electrolyte. The electrolyte includes an electrolyte solution containing a solvent, an electrolyte salt, and a compound having a predetermined structure.

15 Claims, 6 Drawing Sheets

(51) Int. Cl.
  *H01M 10/052*   (2010.01)
  *H01M 10/0568*  (2010.01)
  *H01M 10/0569*  (2010.01)
  *H01M 10/44*    (2006.01)
  *H01M 4/587*    (2010.01)
  *H01M 10/42*    (2006.01)

(52) U.S. Cl.
  CPC ... *H01M 10/0567* (2013.01); *H01M 10/0568* (2013.01); *H01M 10/0569* (2013.01); *H01M 10/4235* (2013.01); *H01M 10/44* (2013.01); *H01M 2300/0025* (2013.01)

(56) References Cited

U.S. PATENT DOCUMENTS

2013/0216919 A1 * 8/2013 Tokuda ............... H01M 10/052
                                                       429/329
2013/0330609 A1   12/2013 Sawa et al.

FOREIGN PATENT DOCUMENTS

| EP | 2365573    | A2 |   | 9/2011  |             |
|----|------------|----|---|---------|-------------|
| EP | 2675010    | A1 |   | 12/2013 |             |
| JP | 10-55820   | A  |   | 2/1998  |             |
| JP | 10-055820  | A  |   | 2/1998  |             |
| JP | 2007-207455| A  |   | 8/2007  |             |
| JP | 2007-242441|    | * | 9/2007  | ... H01M 10/40 2/2 |
| JP | 2008-130528| A  |   | 6/2008  |             |
| JP | 2011-108454| A  |   | 6/2011  |             |
| JP | 2011-187410| A  |   | 9/2011  |             |
| JP | 2012-182132| A  |   | 9/2012  |             |
| JP | 2013-055031| A  |   | 3/2013  |             |
| JP | 2014-179247| A  |   | 9/2014  |             |
| JP | 2016-024853| A  |   | 2/2016  |             |
| KR | 10-2011-0102818 | A |   | 9/2011 |            |
| KR | 10-2014-0036156 | A |   | 3/2014 |            |
| WO | 2012/108270| A1 |   | 1/2012  |             |

OTHER PUBLICATIONS

Office Action for JP Patent Application No. 2015-031305, dated Jul. 31, 2018, 03 pages of Office Action and 03 pages of English Translation.

Office Action for JP Patent Application No. 2015-031305, dated Mar. 5, 2019, 03 pages of Office Action and 03 pages of English Translation.

* cited by examiner

ELECTROLYTE, BATTERY, BATTERY PACK, ELECTRONIC APPARATUS, ELECTRIC VEHICLE, POWER STORAGE APPARATUS, AND POWER SYSTEM

CROSS REFERENCE TO RELATED APPLICATIONS

This application is a U.S. National Phase of International Patent Application No. PCT/JP2016/000314 filed on Jan. 22, 2016, which claims priority benefit of Japanese Patent Application No. JP 2015-031305 filed in the Japan Patent Office on Feb. 20, 2015. Each of the above-referenced applications is hereby incorporated herein by reference in its entirety.

TECHNICAL FIELD

The present technology relates to an electrolyte, a battery, a battery pack, an electronic apparatus, an electric vehicle, a power storage apparatus, and a power system.

BACKGROUND ART

In recent years, an electronic apparatus typified by a mobile phone or portable information terminal equipment is widely used, and the size reduction, reduction in weight, and prolonged service life of the electronic apparatus are strongly desired. Along with this, as a power source, a battery, particularly, a small-sized and light secondary battery that is capable of achieving a high energy density has been developed.

This secondary battery is recently considered to be applied not only to the above-mentioned electronic apparatus but also to various applications typified by an electric tool such as an electric drill, an electric vehicle such as an electric automobile, and a power storage system such as a power server for a house. As power sources of these apparatuses, a secondary battery having high output and a high capacity has been developed.

In the following Patent Literature 1 to Patent Literature 3, technologies relating to a secondary battery are described.

CITATION LIST

Patent Literature

Patent Literature 1: Japanese Patent Application Laid-open No. 2014-179247
Patent Literature 2: Japanese Patent Application Laid-open No. 2013-55031
Patent Literature 3: Japanese Patent Application Laid-open No. 2007-207455

DISCLOSURE OF INVENTION

Technical Problem

In the battery, it is desired to suppress the increase in resistance at the time of storing.

Therefore, it is an object of the present technology to provide an electrolyte, a battery, a battery pack, an electronic apparatus, an electric vehicle, a power storage apparatus, and a power system that are capable of suppressing the increase in resistance at the time of storing.

Solution to Problem

In order to achieve the above-mentioned object, the present technology is an electrolyte, including: an electrolyte solution containing a solvent, an electrolyte salt, and at least one of compounds represented by a formula (1) and a formula (2).

[Chem. 1]

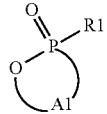

(1)

(In the formula (1), A1 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R1 represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

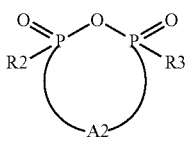

(2)

(In the formula (2), A2 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R2 and R3 each independently represent a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

The present technology is a battery, including: a positive electrode; a negative electrode; and an electrolyte, in which the electrolyte includes an electrolyte solution containing a solvent, an electrolyte salt, and at least one of compounds represented by a formula (1) and a formula (2).

[Chem. 2]

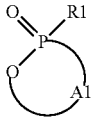

(1)

(In the formula (1), A1 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R1 represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

(2)

(In the formula (2), A2 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R2 and R3 each independently represent a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

A battery pack, an electronic apparatus, an electric vehicle, a power storage apparatus, and a power system according to the present technology include the above-mentioned battery.

Advantageous Effects of Invention

In accordance with the present technology, it is possible to suppress the increase in resistance at the time of storing.

MODE(S) FOR CARRYING OUT THE INVENTION

Figure 1:
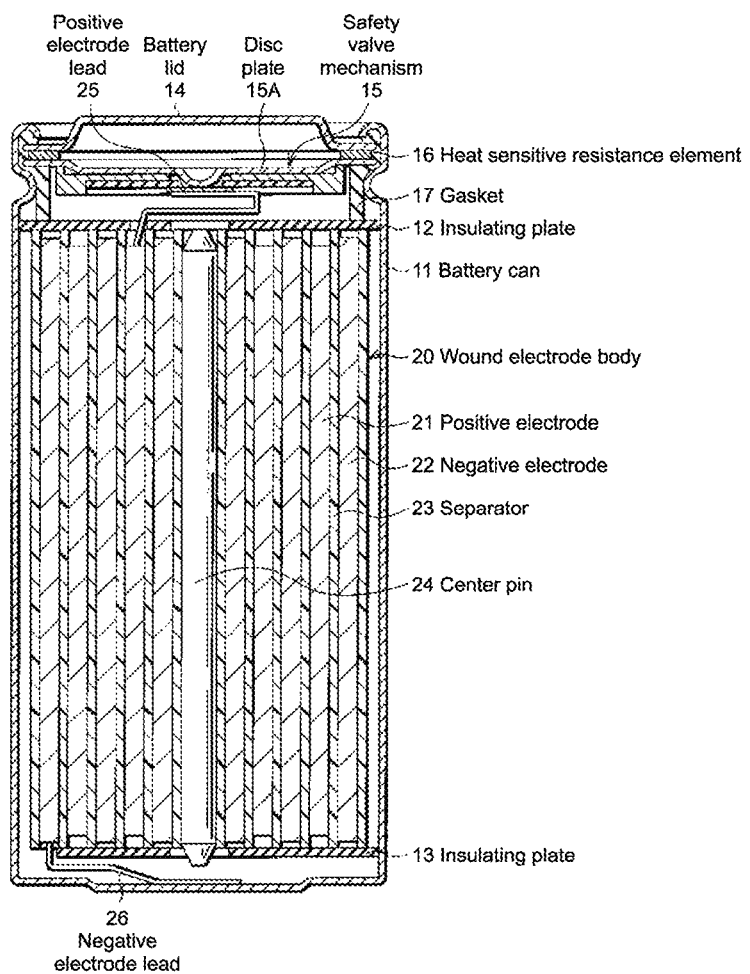
FIG. 1 is a cross-sectional view showing a configuration of a battery according to an embodiment of the present technology.

Hereinafter, embodiments of the present technology will be described with reference to the drawings. Note that descriptions will be made in the following order.
1. First Embodiment (example of electrolyte solution)
2. Second Embodiment (example of cylindrical battery)
3. Third Embodiment (example of cylindrical battery)
4. Fourth Embodiment (example of laminated film battery)
5. Fifth Embodiment (example of battery pack)
6. Sixth Embodiment (example of battery pack)
7. Seventh Embodiment (example of power storage system and the like)
8. Other Embodiments (modified examples)

It should be noted that embodiments and the like described below are favorable specific examples of the present technology, and the content of the present technology is not limited to these embodiments and the like. The effects described herein are merely examples and not necessarily limitative, and do not exclude that there are effects different from the exemplified effects.

1. First Embodiment (1-1) Electrolyte Solution

An electrolyte solution is a liquid electrolyte, and is a non-aqueous electrolyte solution containing a non-aqueous solvent and an electrolyte salt, for example. This electrolyte solution contains at least one of compounds represented by the formula (1) to the formula (2). Accordingly, it is considered possible to improve wettability with a member such as a separator placed between electrodes, and suppress, by a coating film formed on the electrode (at least one of the positive electrode and the negative electrode) by charging and discharging, which is derived from the at least one of compounds represented by the formula (1) to the formula (2), the increase in resistance at the time of storing.

[Chem. 3]

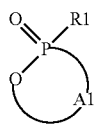
(1)

(In the formula (1), A1 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R1 represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

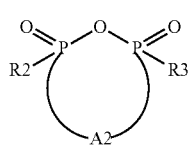
(2)

(In the formula (2), A2 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R2 and R3 each independently represent a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

The "hydrocarbon group" is a generic term for groups formed of C and H, and may be linear, branched having one or more side chains, or cyclic. The "saturated hydrocarbon group" is an aliphatic hydrocarbon group having no carbon-carbon multiple bond. Note that the "aliphatic hydrocarbon group" also includes an alicyclic hydrocarbon group having a ring. The "unsaturated hydrocarbon group" is an aliphatic hydrocarbon group having a carbon-carbon multiple bond (carbon-carbon double bond or carbon-carbon triple bond).

The "monovalent halogenated saturated hydrocarbon group" represents one in which at least a part of hydrogen groups (—H) of the above-mentioned monovalent saturated hydrocarbon group is substituted (halogenated) with a halogen group. The halogen group includes one or two kinds or more of, for example, a fluorine group (—F), a chlorine group (—Cl), a bromine group (—Br), and an iodine group (—I). The "divalent halogenated saturated hydrocarbon group" represents a group in which at least a part of hydrogen groups (—H) of the above-mentioned divalent saturated hydrocarbon group is substituted (halogenated) with a halogen group, and the kind of the halogen group is as described above. The "monovalent halogenated unsaturated hydrocarbon group" represents a group in which at least a part of hydrogen groups (—H) of the above-mentioned monovalent unsaturated hydrocarbon group is substituted (halogenated) with a halogen group, and the kind of the halogen group is as described above. The "divalent halogenated unsaturated hydrocarbon group" represents a group in which at least a part of hydrogen groups (—H) of the above-mentioned divalent unsaturated hydrocarbon group is substituted (halogenated) with a halogen group, and the kind of the halogen group is as described above. The "monovalent halogenated aromatic hydrocarbon group" represents a group in which at least a part of hydrogen groups (—H) of the above-mentioned monovalent halogenated aromatic hydrocarbon group is substituted (halogenated) with a halogen group, and the kind of the halogen group is as described above.

Examples of the compound represented by the formula (1) include compounds represented by formulae (1-1) to (1-9).

[Chem. 4]

(1-1)

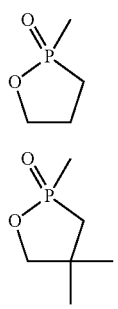

(1-2)

(1-3)

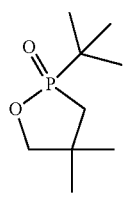

(1-4)

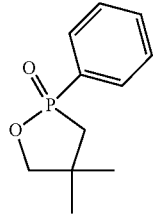

(1-5)

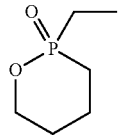

(1-6)

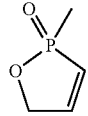

(1-7)

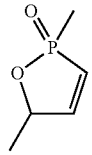

(1-8)

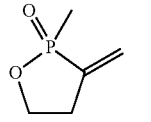

(1-9)

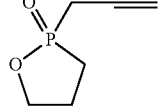

Examples of the compound represented by the formula (2) include compounds represented by formulae (2-1) to (2-4).

[Chem. 5]

(2-1)

(2-2)

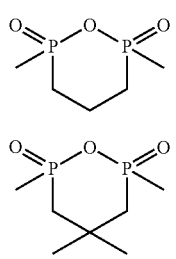

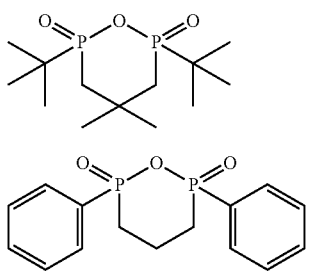

(Content of at Least One of Compounds Represented by Formula (1) to Formula (2))

The content of the at least one of compounds represented by the formula (1) to the formula (2) is favorably not less than 0.001% by mass and not more than 50% by mass, more favorably, not less than 0.01% by mass and not more than 30% by mass, and particularly favorably, not less than 0.1% by mass and not more than 10% by mass with respect to the total mass of the electrolyte solution, from a viewpoint of achieving more excellent effects.

The electrolyte solution may contain a different compound other than the compounds represented by the formula (1) to the formula (2) as well as the at least one of compounds represented by the formula (1) to the formula (2), from a viewpoint of achieving more excellent effects. Examples of the different compound include halogenated carbonic acid ester, unsaturated cyclic carbonic acid ester, sultone (cyclic sulfonic acid ester), a dinitrile compound, an isocyanate compound, and acid anhydride.

(Halogenated Carbonic Acid Ester)

The halogenated carbonic acid ester is a carbonic acid ester containing one or more halogens as constituent elements. Examples of the halogenated carbonic acid ester include at least one of halogenated carbonic acid esters represented by the formula (3) to the formula (4).

[Chem. 6]

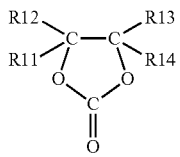

(in the formula (3), R11 to R14 each independently represent a hydrogen group, a halogen group, a monovalent hydrocarbon group, or a monovalent halogenated hydrocarbon group, and at least one of R11 to R14 is a halogen group or a monovalent halogenated hydrocarbon group.)

[Chem. 7]

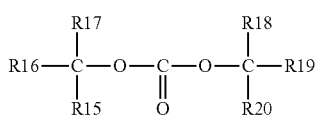

(in the formula (4), R15 to R20 each independently represent a hydrogen group, a halogen group, a monovalent hydrocarbon group, or a monovalent halogenated hydrocarbon group, and at least one of R15 to R20 is a halogen group or a monovalent halogenated hydrocarbon group.)

The halogenated carbonic acid ester represented by the formula (3) is a cyclic carbonic acid esters (halogenated cyclic carbonic acid ester) containing one or more halogens as constituent elements. The halogenated carbonic acid ester represented by the formula (4) is a chain carbonic acid ester (halogenated chain carbonic acid ester) containing one or more halogens as constituent elements.

Examples of the monovalent hydrocarbon group include an alkyl group. Examples of the monovalent halogenated hydrocarbon group include a halogenated alkyl group. Although the kind of halogen is not particularly limited, it is favorably, fluorine (F), chlorine (Cl), or bromine (Br), and more favorably, fluorine. This is because higher effects can be achieved as compared with other halogens. Note that the number of halogens is favorably two rather than one, and may be three or more. This is because the capability to form a protection film is improved and a stronger and more stable protection film is formed, thereby further suppressing the decomposition reaction of the electrolyte solution.

Examples of the halogenated cyclic carbonic acid ester represented by the formula (3) include 4-fluoro-1,3-dioxolan-2-one (FEC), 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-oxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one, and 4-fluoro-4-methyl-1,3-dioxolan-2-one. These may be used alone or a plurality of kinds of them may be combined. This halogenated cyclic carbonic acid ester includes geometric isomers. For example, in the case of 4,5-difluoro-1,3-dioxolan-2-one, a trans isomer thereof is favorable than a cis isomer thereof. This is because it can be easily obtained and high effects can be achieved. Examples of the halogenated chain carbonic acid ester represented by the formula (4) include fluoromethyl methyl carbonate, bis(fluoromethyl) carbonate, and difluoromethyl methyl carbonate.

(Unsaturated Cyclic Carbonic Acid Ester)

The unsaturated cyclic carbonic acid ester is a cyclic carbonic acid ester containing one or more unsaturated carbon bonds (carbon-carbon double bond). Examples of the unsaturated cyclic carbonic acid ester include a compound represented by the formula (5) such as methylene ethylene carbonate (4-methylene-1,3-dioxolan-2-one), vinylene carbonate (VC), and vinyl ethylene carbonate.

[Chem. 8]

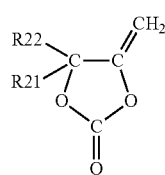

(in the formula (5), R21 and R22 each independently represent a hydrogen group, a halogen group, a monovalent hydrocarbon group, or a monovalent halogenated hydrocarbon group.)

(Sultone (Cyclic Sulfonic Acid Ester))

Examples of the sultone include a compound represented by the formula (6). Examples of the compound represented by the formula (6) include propane sultone and propene sultone.

[Chem. 9]

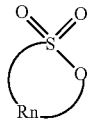

(6)

(in the formula (6), Rn is a divalent hydrocarbon group having n carbon atoms, a ring being formed by the divalent hydrocarbon group together with S (sulfur) and O (oxygen). N represents 2 to 5. The ring may contain an unsaturated double bond.)

(Dinitrile Compound)

The dinitrile compound is a compound containing two nitrile groups (—CN). Examples of the dinitrile compound include at least one of an aliphatic dinitrile compound and aromatic dinitrile compound represented by the formula (7).

[Chem. 10]

$$NC—R31—CN \qquad (7)$$

(in the formula (7), R31 is a divalent hydrocarbon group or a divalent halogenated hydrocarbon group which may contain an oxygen atom or a sulfur atom.)

The kind of R31 is not particularly limited as long as it is a divalent hydrocarbon group or divalent halogenated hydrocarbon group that may contain an oxygen atom or a sulfur atom. The "divalent hydrocarbon group or divalent halogenated hydrocarbon group that may contain an oxygen atom or a sulfur atom" represents any one of the divalent hydrocarbon group, the divalent halogenated hydrocarbon group, the divalent hydrocarbon group containing an oxygen atom or a sulfur atom, and the divalent halogenated hydrocarbon group containing an oxygen atom or a sulfur atom.

The divalent hydrocarbon group is, for example, an alkylene group having 1 to 12 carbon atoms, an alkenylene group having 2 to 12 carbon atoms, an alkynylene group having 2 to 12 carbon atoms, an arylene group having 6 to 18 carbon atoms, a cycloalkylene group having 3 to 18 carbon atoms, a group in which two or more of them are bonded, or, a group in which at least a part of hydrogen groups thereof is substituted with a halogen group. Among them, the number of carbon atoms of the alkylene group, alkenylene group, or alkynylene group is more favorably not more than six. This is because excellent solubility and compatibility can be achieved.

More specifically, examples of the alkylene group include a methylene group (—$CH_2$—), an ethylene group (—$C_2H_4$—), a propylene group (—$C_3H_6$—), and a butylene group (—$C_4H_8$—). Examples of the alkenylene group include a vinylene group (—CH=CH—). Examples of the alkynylene group include an ethynylene group (—C≡C—). Examples of the arylene group include a phenylene group. Examples of the cycloalkylene group include a cyclopropylene group and a cyclobutylene group.

The "group in which two or more of them are bonded" represents a group in which two or more of the above-mentioned alkylene group and the like are bonded to be a divalent group as a whole, and is, for example, a group in which an alkylene group and an arylene group are bonded.

The "divalent halogenated hydrocarbon group" is obtained by halogenating the above-mentioned divalent hydrocarbon group. More specifically, examples of a group obtained by halogenating an alkylene group or the like include a difluoromethylene group (—$CF_2$—).

Examples of the dinitrile compound include succinonitrile, glutaronitrile, adiponitrile, pimelonitrile, suberonitrile, azelanitrile, sebaconitrile, phthalonitrile, 3,3'-oxydipropionitrile, ethylene glycol bis(propionitrile) ether, and 3,3'-thiodipropionitrile.

(Isocyanate Compound)

The isocyanate compound represents a compound containing one or more isocyanate groups. Examples of the isocyanate group include hexamethylene diisocyanate, 2,2,4-trimethylhexamethylene diisocyanate, 2,4,4-trimethylhexamethylene diisocyanate, isophorone diisocyanate, and 2-isocyanatoethyl methacrylate.

(Acid Anhydride)

Examples of the acid anhydride include carboxylic anhydride, disulfonic acid anhydride, and anhydride of carboxylic acid and sulfonic acid. Examples of the carboxylic anhydride include succinic anhydride, glutaric anhydride, and maleic anhydride. Examples of the disulfonic acid anhydride include anhydrous ethane disulfonic acid and anhydrous propane disulfonic acid. Examples of the anhydride of carboxylic acid and sulfonic acid include anhydrous sulfobenzoic acid, sulfopropionic anhydride, and anhydrous sulfobutyric acid.

(Non-Aqueous Solvent)

As the non-aqueous solvent, ethylene carbonate (EC), propylene carbonate (PC), butylene carbonate, dimethyl carbonate (DMC), ethyl methyl carbonate (EMC), γ-butyrolactone, γ-valerolactone, 1,2-dimethoxyethane, tetrahydrofuran, 2-Methyltetrahydrofuran, tetrahydropyran, 1,3-dioxolane, 4-methyl-1,3-dioxolane, 1,3-dioxane, 1,4-dioxane, acetonitrile, glutaronitrile, adiponitrile, methoxyacetonitrile, 3-methoxypropionitrile, N, N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, and the like can be used. These may be used alone or a plurality of kinds of them may be combined.

Further, the non-aqueous solvent may contain an aromatic compound, for example. Examples of the aromatic compound include halogenated benzene compounds such as chlorobenzene, chlorotoluene, and fluorobenzene, and alkylated aromatic compounds such as tert-butylbenzene, tert-pentylbenzene, cyclohexylbenzene, hydrogen biphenyl, and hydrogenated terphenyl. The alkyl group may be halogenated. In particular, the alkyl group is favorably fluorinated. Examples of such an aromatic compound include trifluoromethoxybenzene. Examples of a different aromatic compound include anisoles that may contain a substitution group. More specifically, examples of the different aromatic compound include 2,4-difluoroanisole and 2,2-difluorobenzodioxole.

(Electrolyte Salt)

The electrolyte salt contains one or more of a lithium salt and the like to be described later, for example. Note that the electrolyte salt may contain another salt (e.g., light metal salt other than the lithium salt) other than the lithium salt, for example.

Examples of the electrolyte salt include, as a lithium salt, lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium methane sulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl), and lithium bromide (LiBr).

Among them, the electrolyte salt favorably contains one or more of lithium hexafluorophosphate, lithium tetrafluoroborate, lithium perchlorate, and lithium hexafluoroarsenate, and more favorably contains lithium hexafluorophosphate. This is because the internal resistance can be reduced, thereby achieving higher effects.

The electrolyte salt may contain not only the above-mentioned lithium salt but also one or more of a metal salt such as a lithium salt to be described later. Note that the electrolyte salt does not necessarily need to contain the metal salt together with the above-mentioned lithium salt, and may contain the metal salt alone.

The electrolyte salt favorably contains at least one of lithium difluorophosphate represented by the formula (8) and a lithium monofluorophosphate represented by the formula (9). This is because higher effects can be achieved.

$$LiPF_2O_2 \tag{8}$$

$$Li_2PFO_3 \tag{9}$$

The electrolyte salt favorably contains at least one of compounds represented by formulae (10) to (16). This is because higher effects can be achieved. Note that R33 in the formula (10) may be the same one or a different one. The same applies to R41 to R43 in the formula (11) and R51 and R52 in the formula (12).

[Chem. 11]

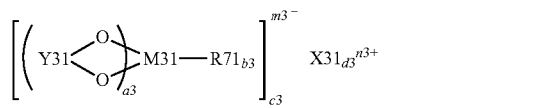
(10)

(X31 represents a group 1 element or a group 2 element in the long form periodic table, or aluminum. M31 represents a transition metal element, or a group 13 element, a group 14 element, or a group 15 element in the long form periodic table. R71 represents a halogen group. Y31 represents —OC—R32—CO—, —OC—C(R33)$_2$—, or —OC—CO—. Note that R32 represents an alkylene group, a halogenated alkylene group, an arylene group, or a halogenated arylene group. R33 represents an alkyl group, a halogenated alkyl group, an aryl group, or a halogenated aryl group. Note that a3 represents an integer of 1 to 4, b3 represents 0, 2, or 4, and c3, d3, m3, and n3 each represent an integer of 1 to 3.)

[Chem. 12]

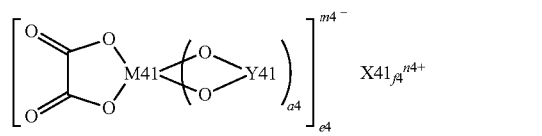
(11)

(X41 represents a group 1 element or a group 2 element in the long form periodic table. M41 represents a transition metal element, or a group 13 element, 1 group 14 element, or a group 15 element in the long form periodic table. Y41 represents —(O=)C—(C(R41)$_2$)$_{b4}$—C(=O)—, —(R43)$_2$C—(C(R42)$_2$)$_{c4}$—C(=O)—, —(R43)$_2$C—(C(R42)$_2$)$_{c4}$—C(R43)$_2$—, —(R43)$_2$C—(C(R42)$_2$)$_{c4}$—S(=O)$_2$—, —(O=)$_2$S—(C(R42)$_2$)$_{d4}$—S(=O)$_2$—, or —(O=)C—(C(R42)$_2$)$_{d4}$—S(=O)$_2$—. Note that R41 and R43 independently represent a hydrogen group, an alkyl group, a halogen group, or a halogenated alkyl group, and at least one of R41 and at least one of R43 are each a halogen group or a halogenated alkyl group. R42 represents a hydrogen group, an alkyl group, a halogen group, or a halogenated alkyl group. Note that a4, e4, and n4 each represents 1 or 2, b4 and d4 each represent an integer of 1 to 4, c4 represents an integer of 0 to 4, and f4 and m4 each represent an integer of 1 to 3.)

[Chem. 13]

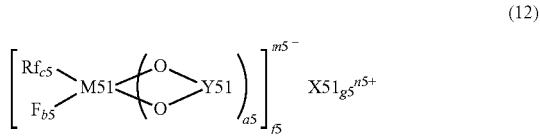
(12)

(X51 represents a group 1 element or a group 2 element in the long form periodic table. M51 represents a transition metal element, or a group 13 element, a group 14 element, or a group 15 element in the long form periodic table. Rf represents a fluorinated alkyl group or a fluorinated aryl group, and the number of carbon atoms thereof is 1 to 10. Y51 represents —(O=)C—(C(R51)$_2$)$_{d5}$—C(=O)—, —(R52)$_2$C—(C(R51)$_2$)$_{d5}$—C(=O)—, —(R52)$_2$C—(C(R51)$_2$)$_{d5}$—C(R52)$_2$—, —(R52)$_2$C—(C(R51)$_2$)$_{d5}$—S(=O)$_2$—, —(O=)$_2$S—(C(R51)$_2$)$_{e5}$—S(=O)$_2$—, or —(O=)C—(C(R51)$_2$)$_{e5}$—S(=O)$_2$—. Note that R51 represent a hydrogen group, an alkyl group, a halogen group, or a halogenated alkyl group. R52 represents a hydrogen group, an alkyl group, a halogen group, or a halogenated alkyl group, and at least one of R52 is a halogen group or a halogenated alkyl group. Note that a5, f5, and n5 each represent 1 or 2, b5, c5, and e5 each represent an integer of 1 to 4, d5 represents an integer of 0 to 4, and g5 and m5 each represent an integer of 1 to 3.)

Note that the group 1 element in the long form periodic table is hydrogen (H), lithium (Li), sodium (Na), potassium (K), rubidium (Rb), cesium (Cs), and francium (Fr). The group 2 element is beryllium (Be), magnesium (Mg), calcium (Ca), strontium (Sr), barium (Ba), and radium (Ra). The group 13 element is boron, aluminum (Al), gallium (Ga), indium (In), and thallium (Tl). The group 14 element is carbon, silicon, germanium (Ge), tin (Sn), and lead (Pb). The group 15 element is nitrogen, phosphorus, arsenic (As), antimony (Sb), and bismuth (Bi).

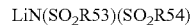
(13)

(in the formula, R53 and R54 each represent a halogen group, a monovalent hydrocarbon group, or a monovalent halogenated hydrocarbon group, and at least one of R53 and R54 is a halogen group or a monovalent halogenated hydrocarbon group.)

[Chem. 14]

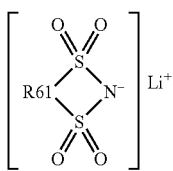
(14)

(R61 represents a linear or branched perfluoroalkylene group having 2 to 4 carbon atoms.)

$$\text{LiC}(C_pF_{2p+1}SO_2)(C_qF_{2q+1}SO_2)(C_rF_{2r+1}SO_2) \quad (15)$$

(p, qm, and r each represent an integer or not less than 1)

Examples of the compound represented by the formula (10) include compounds represented by formulae (10-1) to (10-6). Note that the compound represented by the formula (10-1) is lithium difluoro oxalato borate. Examples of the compound represented by the formula (11) include compounds represented by formulae (11-1) to (11-8). Examples of the compound represented by the formula (12) include a compound represented by the formula (12-1).

[Chem. 15]

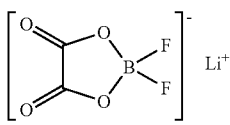
(10-1)

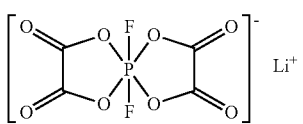
(10-2)

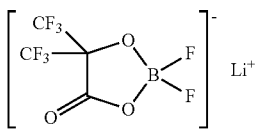
(10-3)

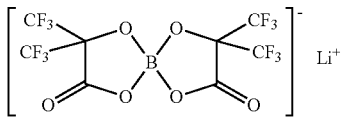
(10-4)

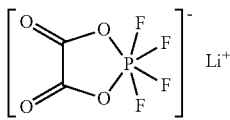
(10-5)

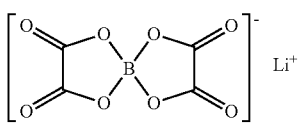
(10-6)

[Chem. 16]

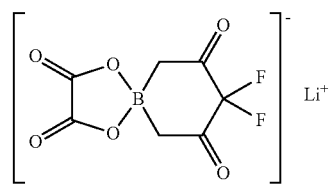
(11-1)

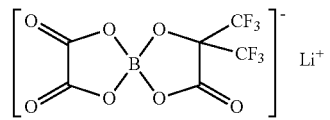
(11-2)

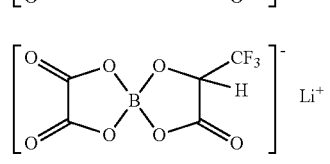
(11-3)

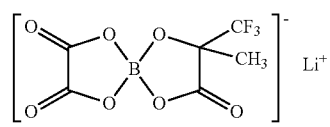
(11-4)

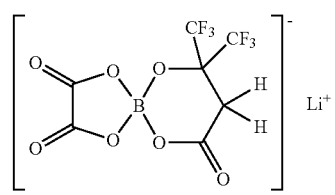
(11-5)

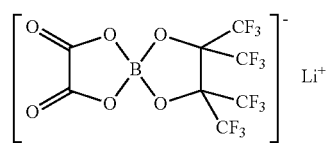
(11-6)

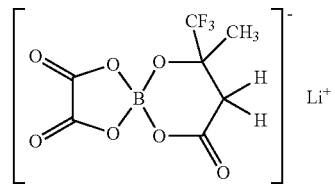
(11-7)

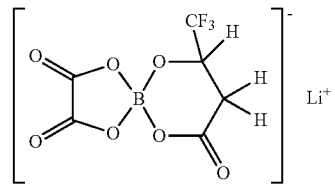
(11-8)

[Chem. 17]

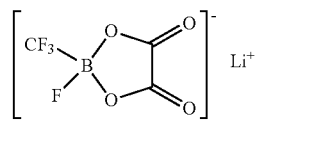
(12-1)

The compound represented by the formula (13) is a chain imide compound. Examples of the compound include bis (trifluoromethanesulfonyl) imide lithium (LiN(CF$_3$SO$_2$)$_2$), bis(pentafluoroethanesulfonyl) imide lithium (LiN (C$_2$F$_5$SO$_2$)$_2$), (trifluoromethanesulfonyl) (pentafluoroethanesulfonyl) imide lithium (LiN(CF$_3$SO$_2$)(O$_2$F$_5$SO$_2$)), (trifluoromethanesulfonyl) (heptafluoropropanesulfonyl) imide lithium (LiN(CF$_3$SO$_2$) (C$_3$F$_7$SO$_2$)), (trifluoromethanesulfonyl) (nonafluorobutanesulfonyl) imide lithium (LiN (CF$_3$SO$_2$) (O$_4$F$_9$SO$_2$)), bis(fluorosulfonyl) imide lithium (LiN(FSO$_2$)$_2$), and (fluorosulfonyl) (trifluoromethanesulfonyl) imide lithium (LiN(CF$_3$SO$_2$) (FSO$_2$)).

The compound represented by the formula (14) is a cyclic imide compound. Examples of this compound include compounds represented by formulae (14-1) to (14-4), i.e., 1,2-perfluoroethanedisulfonylimide lithium represented by the formula (14-1), 1,3-perfluoropropanedisulfonylimide lithium represented by the formula (14-2), 1,3-perfluorobutane disulfonyl imide lithium represented by the formula (14-3), and 1,4-perfluorobutane disulfonyl imide lithium represented by the formula (14-4).

[Chem. 18]

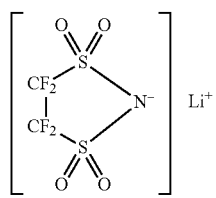

(14-1)

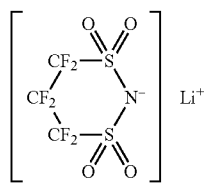

(14-2)

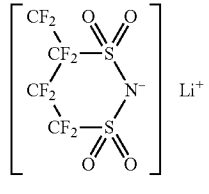

(14-3)

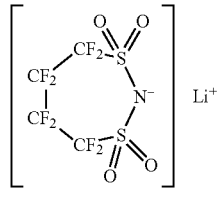

(14-4)

The compound represented by the formula (15) is a chain methide compound. Examples of this compound include a lithium tris(trifluoromethanesulfonyl) methide (LiC (CF$_3$SO$_2$)$_3$).

2. Second Embodiment

A battery according to a second embodiment of the present technology will be described. This battery uses the above-mentioned electrolyte solution. This battery is, for example, a non-aqueous electrolyte battery, a secondary battery that is capable of charging and discharging, and a lithium ion secondary battery in which the capacity of a negative electrode is represented by absorption and release of lithium ions, which are electrode reactive materials.

(2-1) Configuration of Non-Aqueous Electrolyte Battery

Figure 2:
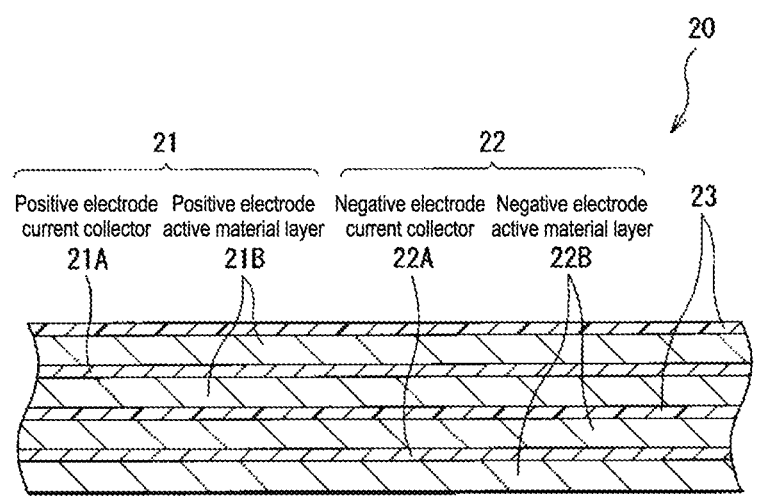
FIG. 2 is an enlarged cross-sectional view showing a part of a wound electrode body shown in FIG. 1.

FIG. 1 and FIG. 2 each show a cross-sectional configuration of a non-aqueous electrolyte battery according to the second embodiment. FIG. 2 enlarges and shows a part of a wound electrode body 20 shown in FIG. 1.

[Whole Configuration of Non-Aqueous Electrolyte Battery]

This non-aqueous electrolyte battery is obtained by mainly placing the wound electrode body 20 and a pair of insulating plates 12 and 13 in a substantially hollow cylindrical battery can 11. A battery structure using such battery can 11 is called as "cylindrical".

The battery can 11 has, for example, a hollow structure in which an end portion is closed and the other end portion is opened, and is formed of iron (Fe), aluminum (Al), an alloy thereof, or the like. Note that in the case where the battery can 11 is formed of iron, for example, nickel (Ni) or the like may be plated on the surface of the battery can 11. The pair of insulating plates 12 and 13 sandwiches the wound electrode body 20 from the top and bottom, and is placed so as to extend vertically to the winding peripheral surface.

In the opened end portion of the battery can 11, a battery lid 14, a safety valve mechanism 15, and a heat sensitive resistance element (Positive Temperature Coefficient: PTC element) 16 are caulked via a gasket 17, and the battery can 11 is hermetically sealed. The battery lid 14 is formed of, for example, a material similar to that of the battery can 11. The safety valve mechanism 15 and the heat sensitive resistance element 16 are provided in the battery lid 14. The safety valve mechanism 15 is electrically connected to the battery lid 14 via the heat sensitive resistance element 16. In the safety valve mechanism 15, in the case where the internal pressure is not less than a certain level due to internal short circuit, heat from the outside, and the like, a disc plate 15A turns over and electrical connection between the battery lid 14 and the wound electrode body 20 is cut off. The heat sensitive resistance element 16 prevents abnormal heat generation due to a large amount of current from occurring by increasing the resistance (restricting current) depending on the temperature increase. The gasket 17 is formed of, for example, an insulating material, and, for example, asphalt is applied to the surface of the gasket 17.

The wound electrode body 20 is obtained by laminating and winding a positive electrode 21 and a negative electrode 22 via a separator 23. A center pin 24 may be inserted in the center of the wound electrode body 20. In the wound electrode body 20, a positive electrode lead 25 formed of aluminum or the like is connected to the positive electrode 21 and a negative electrode lead 26 formed of nickel or the like is connected to the negative electrode 22. The positive electrode lead 25 is electrically connected to the battery lid 14 by, for example, being welded to the safety valve mechanism 15, and the negative electrode lead 26 is electrically connected to the battery can 11 by being welded thereto.

(Positive Electrode)

The positive electrode 21 is obtained by, for example, providing a positive electrode active material layer 21B to both surfaces of a positive electrode current collector 21A. Note that the positive electrode active material layer 21B may be provided only to one surface of the positive electrode current collector 21A.

The positive electrode current collector 21A is formed of, for example, aluminum, nickel, stainless (SUS), or the like.

The positive electrode active material layer 21B contains, as a positive electrode active material, one or more of positive electrode materials capable of absorbing and releasing lithium ions, and may contain another material such as a binding agent and a conductive agent as necessary.

As the positive electrode materials capable of absorbing and releasing lithium ions, lithium-containing compounds such as lithium oxide, lithium phosphorus oxide, lithium sulfide, and an interlayer compound containing lithium are appropriate, and two or more of them may be mixed and used. In order to increase the energy density, a lithium-containing compound containing lithium, a transition metal element, and oxygen (O) is favorable. Examples of such a lithium-containing compound include lithium composite oxide that has a layered rock salt type structure and is represented by the formula (A) and lithium composite phosphate that has an olivine type structure and is represented by the formula (B). As the lithium-containing compound, those containing, as a transition metal element, at least one of elements selected from the group consisting of cobalt (Co), nickel (Ni), manganese (Mn), and iron (Fe) are more favorable. Examples of such a lithium-containing compound include lithium composite oxide that has a layered rock salt type structure and is represented by the formula (C), the formula (D), or the formula (E), lithium composite oxide that has a spinel type structure and is represented by the formula (F), lithium composite phosphate that has an olivine type structure and is represented by the formula (G), and specifically, $LiNi_{0.50}Co_{0.20}Mn_{0.30}O_2$, $Li_aCoO_2(a\approx1)$, $Li_bNiO_2(b\approx1)$, $Li_{c1}Ni_{c2}Co_{1-c2}O_2(c1\approx1, 0<c2<1)$, $Li_dMn_2O_4$, and $LiEFePO_4(e\approx1)$.

$$Li_pNi_{(1-q-r)}Mn_qM1_rO_{(2-y)}X_z \quad (A)$$

(in the formula, M1 represents at least one of elements selected from group 2 elements to group 15 elements other than nickel (Ni) and manganese (Mn). X represents at least one of group 16 elements and group 17 elements other than oxygen (O). p, q, y, and z represent values satisfying the following relationships, $0\leq p\leq1.5$, $0\leq q\leq1.0$, $0\leq r\leq1.0$, $-0.10\leq y\leq0.20$, and $0\leq z\leq0.2$)

$$Li_aM2_bPO_4 \quad (B)$$

(in the formula, M2 represents at least one of elements selected from group 2 elements to group 15 elements. a and b represent values satisfying the following relationships, $0\leq a\leq2.0$ and $0.5\leq b\leq2.0$.)

$$Li_fMn_{(1-g-h)}Ni_gM3_hO_{(2-j)}F_k \quad (C)$$

(in the formula, M3 represents at least one of elements selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k represent values satisfying the following relationships, $0.8\leq f\leq1.2$, $0<g<0.5$, $0\leq h\leq0.5$, $g+h<1$, $-0.1\leq j\leq0.2$, and $0\leq k\leq0.1$. Note that the composition of lithium is different depending on the state of charge and discharge, and the value of f represents a value in the complete discharge state.)

$$Li_mNi_{(1-n)}M4_nO_{(2-p)}F_q \quad (D)$$

(in the formula, M4 represents at least one of elements selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p, and q represent values satisfying the following relationships, $0.8\leq m\leq1.2$, $0.005\leq n\leq0.5$, $-0.1\leq p\leq0.2$, and $0\leq q\leq0.1$. Note that the composition of lithium is different depending on the state of charge and discharge, and the value of m represents a value in the complete discharge state.)

$$Li_rCo_{(1-s)}M5_sO_{(2-t)}F_u \quad (E)$$

(in the formula, M5 represents at least one of elements selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s, t, and u represent values satisfying the following relationships, $0.8\leq r\leq1.2$, $0\leq s<0.5$, $-0.1\leq t\leq0.2$, and $0\leq u\leq0.1$. Note that the composition of lithium is different depending on the state of charge and discharge, and the value of r represents a value in the complete discharge state.)

$$Li_vMn_{2-w}M6_wO_xF_y \quad (F)$$

(in the formula, M6 represents at least one of elements selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x, and y represent values satisfying the following relationships, $0.9\leq v\leq1.1$, $0\leq w\leq0.6$, $3.7\leq x\leq4.1$, and $0\leq y\leq0.1$. Note that the composition of lithium is different depending on the state of charge and discharge, and the value of v represents a value in the complete discharge state.)

$$Li_zM7PO_4 \quad (G)$$

(in the formula, M7 represents at least one of elements selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). z represents a value satisfying the following relationship, $0.9\leq z\leq1.1$. Note that the composition of lithium is different depending on the state of charge and discharge, and the value of z represents a value in the complete discharge state.)

As the positive electrode materials capable of absorbing and releasing lithium ions, covering particles containing particles of the above-mentioned lithium-containing compound and a covering layer provided to at least a part of a surface of particles of a lithium-containing compound to be a base material thereof may be used. By using such covering particles, it is possible to further improve the battery characteristics.

The covering layer is provided to at least a part of a surface of particles of a lithium-containing compound such as lithium cobalt composite oxide to be a base material, and has a different composition element or composition ratio from those of the particles of a lithium-containing compound such as lithium cobalt composite oxide to be a base material. Examples of the covering layer include those containing oxide, a transition metal compound, or the like. Specifically, the covering layer includes, for example, oxide containing lithium (Li) and at least one of nickel (Ni) and manganese (Mn), a compound containing at least one of elements selected from the group consisting of nickel (Ni), cobalt (Co), manganese (Mn), iron (Fe), aluminum (Al), magnesium (Mg), and zinc (Zn), oxygen (O), and phosphorus (P), or the like. The covering layer may contain halide such as lithium fluoride or chalcogenide other than oxygen.

The existence of the covering layer can be confirmed by checking the change in the concentration of constituent elements from the surface of the positive electrode material to the inside thereof. For example, the concentration change can be measured by performing auger electron spectroscopy (AES) or SIMS (Secondary Ion Mass Spectrometry) on the composition of particles of the lithium composite oxide to which the covering layer is provided while grinding them by sputtering or the like. Further, it can be measured by dissolving particles of the lithium composite oxide to which the covering layer is provided in an acid solution or the like and performing inductively coupled plasma (ICP) spectroscopy or the like on the time change in the amount of the elution.

In addition, examples of the positive electrode material include oxide, disulfide, chalcogenide, and conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

It goes without saying that the positive electrode material may be a different material other than those described above. Further, two or more of the above-mentioned series of positive electrode materials may be mixed in arbitrary combination.

(Binding Agent)

Examples of the binding agent include synthetic rubbers such as styrene butadiene-based rubber, fluorine-based rubber, and ethylene propylene diene, and polymer materials such as polyvinylidene fluoride. They may be used alone or a plurality of them may be mixed.

(Conductive Agent)

Examples of the conductive agent include carbon materials such as graphite, carbon black, acetylene black, and ketchen black. They may be used alone or a plurality of them may be mixed. Note that the positive electrode conductive agent may be a metal material, conductive polymer, or the like, as long as it has conductivity.

(Negative Electrode)

The negative electrode 22 is obtained by, for example, providing a negative electrode active material layer 22B to both surfaces of a negative electrode current collector 22A. Note that the negative electrode active material layer 22B may be provided only to one surface of the negative electrode current collector 22A.

The negative electrode current collector 22A is formed of, for example, copper, nickel, stainless, or the like.

The negative electrode active material layer 22B contains, as a negative electrode active material, one or more of negative electrode materials capable of absorbing and releasing lithium ions, and may contain a different material such as a binding agent and a conductive agent as necessary. Note that details of the binding agent and the conductive agent are respectively similar to, for example, those of the binding agent and the conductive agent of the positive electrode 21.

Note that in this non-aqueous electrolyte battery, it is favorable that the electrochemical equivalent of the negative electrode material capable of absorbing and releasing lithium ions is larger than that of the positive electrode 21, and theoretically, lithium metal does not precipitate on the negative electrode 22 during charging.

Examples of the negative electrode materials capable of absorbing and releasing lithium include non-graphitizable carbon, easily graphitizable carbon, graphite, pyrolytic carbons, cokes, glassy carbons, baked organic polymer compounds, carbon fiber, activated carbon and other carbon materials. Examples of cokes in these materials include pitch coke, needle coke, and petroleum coke. The baked organic polymer compounds are materials in which a polymer material such as phenolic resin and furan resin is baked at appropriate temperatures and carbonized. Some of the baked organic polymer compounds can also be classified as non-graphitizable carbon, or easily graphitizable carbon. These carbon materials are favorable because possible changes in crystal structure of such materials in charging and discharging are very small, and high charge-discharge capacity and good cycle characteristics can be achieved. In particular, graphite is favorable because of its large electrochemical equivalent and capability of providing high energy density. Further, non-graphitizable carbon is favorable because of its capability of providing excellent cycle characteristics. Further, the carbon materials that show low charge-discharge potential, specifically, those that show charge-discharge potential close to that shown by lithium metal is favorable because such materials make it easier to realize high energy density of the battery.

Further, examples of another negative electrode material capable of absorbing and releasing lithium and increasing the capacity include a material that is capable of absorbing and releasing lithium and contains at least one of a metal element and a metalloid element as a constituent element. This is because high energy density can be achieved when this kind of material is used. In particular, it is more favorable to use such a material together with a carbon material because high energy density and also excellent cycle characteristics can be achieved. This negative electrode material may be in any form of either or both of metal elements and metalloid elements, such as a single substance, an alloy, and a compound, and a material that includes one or more of these forms at least in a portion thereof. Note that the term "alloy" encompasses alloys containing two or more kinds of metal elements, and also alloys containing one or more kinds of metal elements and one or more kinds of metalloid elements. Further, these alloys may also contain non-metal elements. Tissues of these alloys include a solid solution, a eutectic crystal (eutectic mixture), or an intermetallic compound, and two or more thereof may coexist.

Examples of the metal elements or the metalloid elements constituting such a negative electrode material include metal elements and metalloid elements that are capable of forming an alloy with lithium. Specific examples of the metal elements and metalloid elements include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

Favorably, the negative electrode material may be one that contains a metal element or a metalloid element belonging to group 4B in the short form periodic table as a constituent element. One that contains at least one of silicon (Si) and tin (Sn) as a constituent element is more favorable, and one that contains at least silicon is particularly favorable. This is because silicon (Si) and tin (Sn) have high capability for absorbing and releasing lithium and high energy density can be achieved. Examples of the negative electrode materials having at least one of silicon and tin include a single substance, an alloy, and a compound of silicon, a single substance, an alloy, and a compound of tin, and a material that includes one or more of these forms at least in a portion thereof.

Examples of alloys of silicon include an alloy containing, as its second constituent element other than silicon, at least one kind of element selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of alloys of tin include an alloy containing, as its second constituent element other than tin (Sn), at least one kind of element selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of compounds of tin (Sn) or compounds of silicon (Si) include a compound that contains oxygen (O) or carbon (C). Such compounds may also contain, in addition to tin (Sn) or silicon (Si), any of the second constituent elements described above.

Among these materials, a SnCoC-containing material that contains cobalt (Co), tin (Sn), and carbon (C) as constituent elements, in which the content of carbon is not less than 9.9% by mass and not more than 29.7% by mass and the proportion of cobalt (Co) of the sum of tin (Sn) and cobalt (Co) is not less than 30% by mass and not more than 70% by mass, is favorable as the negative electrode material. This is because high energy density and excellent cycle characteristics can be achieved in such a composition range.

The SnCoC-containing material may further contain other constituent elements as necessary. As these other constituent elements, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), and bismuth (Bi) are favorable, and two or more thereof may be contained. This is because capacitance characteristics or cycle characteristics can be further improved.

Note that it is favorable that the SnCoC-containing material has a phase containing tin (Sn), cobalt (Co) and carbon (C), in which the phase has a low crystallized or amorphous structure. Further, in the SnCoC-containing material, it is favorable that at least a part of carbon (C) as the constituent element is bound to a metal element or a metalloid element as the other constituent element. This is because lowering of cycle characteristics may be due to aggregation or crystallization of tin (Sn) or the like, and carbon (C) is bound to other elements, making it possible to suppress such aggregation or crystallization.

Examples of measurement methods for examining the binding state of elements include X-ray photoelectron spectroscopy (XPS). In this XPS, so far as graphite is concerned, a peak of the is orbit of carbon (Cis) appears at 284.5 eV in an energy-calibrated apparatus such that a peak of the 4f orbit of a gold atom (Au4f) is obtained at 84.0 eV. Also, so far as surface-contaminated carbon is concerned, it appears at 284.8 eV. Meanwhile, when a charge density of the carbon element is high, for example, when carbon is bound to a metal element or a metalloid element, the peak of C1s appears in a lower region than 284.5 eV. That is, when a peak of a combined wave of C1s obtained on the SnCoC-containing material appears in a lower region than 284.5 eV, at least a part of carbon contained in the SnCoC-containing material is bound to a metal element or a metalloid element as other constituent element.

Note that in the XPS measurement, for example, the peak of C1s is used for correcting the energy axis of a spectrum. In most cases, because there is some surface-contaminated carbon present in the surface, the peak of C1s of the surface-contaminated carbon can be fixed at 284.8 eV, and this peak can be used as an energy reference. In the XPS measurement, because a waveform of the peak of C1s can be obtained as a form that includes both the peak of the surface-contaminated carbon and the peak of carbon from the SnCoC-containing material, for example, through an analysis using commercial software programs, the peak of the surface-contaminated carbon and the peak of the carbon from the SnCoC-containing material can be separated from each other. In the analysis of the waveform, the position of a main peak existing closer to the lowest binding energy is used as an energy reference (284.8 eV).

Examples of the negative electrode materials capable of absorbing and releasing lithium include metal oxides and polymer compounds, each of which is capable of absorbing and releasing lithium. Examples of the metal oxides include, lithium titanium oxide containing lithium and titanium such as lithium titanate ($Li_4Ti_5O_{12}$), iron oxide, ruthenium oxide, and molybdenum oxide. Examples of the polymer compounds include polyacetylene, polyaniline, and polypyrrole.

The negative electrode active material layer 22B may be, for example, formed by any of a vapor phase method, a liquid phase method, a spraying method, a applying method, a baking method, and a combined method of two or more kinds of these methods.

Note that examples of the vapor phase method include a physical deposition method and a chemical deposition method, specifically a vacuum vapor deposition method, a sputtering method, an ion plating method, a laser abrasion method, a thermal chemical vapor deposition (CVD) method, and a plasma chemical vapor deposition method. As the liquid phase method, known techniques such as electrolytic plating and electroless plating can be used. The applying method is, for example, a method in which a particulate negative electrode active material is mixed with a binding agent or the like and then dispersed in a solvent for applying. The baking method is, for example, a method of performing heat treatment at a temperature higher than the melting point of the binding agent or the like after applying by the applying method. As the baking method, known techniques can be also utilized, and examples thereof include an atmospheric baking method, a reaction baking method and a hot press baking method.

(Separator)

The separator 23 isolates the positive electrode 21 and the negative electrode 22, and allows lithium ions to pass while preventing a short circuit of current caused by contact between the both electrodes.

The separator 23 is, for example, a porous film formed of resin. The porous film formed of resin is obtained by thinly stretching a material such as resin and has a porous structure. For example, the porous film formed of resin is obtained by molding a material such as resin by a stretch opening method, a phase separation method, or the like. For example, in the stretch opening method, first, a molten polymer is extruded from a T die or a circular die and then subjected to heat treatment to form a crystalline structure with high regularity. After that, it is subjected to low-temperature stretching and high-temperature stretching to peel off the crystal interface to form a spacing portion between lamellae, thereby forming a porous structure. In the phase separation method, a homogeneous solution prepared by mixing a polymer and a solvent at a high temperature is formed into a film by a T-die method, an inflation method, or the like, and then the solvent is extracted with another volatile solvent, thereby obtaining a porous film formed of resin. Note that the method of producing the porous film formed of resin is not limited thereto, and conventionally proposed methods can be widely used. As the resin material forming the separator 23, for example, polyolefin resin such as polypropylene and polyethylene, acrylic resin, styrene resin, polyester resin, nylon resin, or the like is favorably used. In particular, polyethylene such as low density polyethylene, high density polyethylene, and linear polyethylene, low molecular weight wax thereof, and polyolefin resin such as polypropylene are suitably used because they have a suitable melting temperature and are easy to obtain. Further, a structure obtained by laminating two or more of the porous films or a porous film formed by melt-kneading two or more resin materials. Those containing a porous film formed of polyolefin resin have excellent separability between the positive electrode 21 and the negative electrode 22, and can further suppress the reduction in internal short circuit.

The separator 23 may be a non-woven fabric. The non-woven fabric is a structure produced by mechanically, chemically, or with a solvent, or a combination thereof, joining, entangling, or joining and entangling fibers, without weaving or knitting the fibers. Most materials that can be processed into fibers can be used as the raw material of the nonwoven fabric, and by adjusting the shape such as a fiber length and a thickness, it is possible to cause the materials to have the function depending on the purpose and use. The method of producing the non-woven fabric typically includes two stages of a step of forming an accumulation layer of fibers called a fleece and a bonding step of bonding fibers of the fleece. At each stage, various production methods can be used, and the production methods are selected depending on the raw material, purpose, and use of the non-woven fabric. For example, in the step of forming a fleece, a dry method, a wet method, a spunbond method, a melt blow method, and the like can be used. In the bonding step of bonding fibers of the fleece, a thermal bond method, a chemical bond method, a needle punching method, a spunlace method (water flow entangling method), a stitch bond method, a steam jet method, and the like can be used.

Examples of the non-woven fabric include a polyethylene terephthalate permeable film (polyethylene terephthalate non-woven fabric) using polyethylene terephthalate (PET) fiber. Note that the air permeable film is a film having air permeability. Other examples of the non-woven fabric include those using aramid fiber, glass fiber, cellulose fiber, polyolefin fiber, nylon fiber, or the like. The non-woven fabric may be one using two or more kinds of fibers.

(Electrolyte Solution)

The separator 23 is impregnated with an electrolyte solution that is a liquid electrolyte. As the electrolyte solution, the electrolyte solution according to the first embodiment can be used.

[Operation of Non-Aqueous Electrolyte Battery]

In this non-aqueous electrolyte battery, lithium ions are released from, for example, the positive electrode 21 at the time of charging, and absorbed in the negative electrode 22 via the electrolyte solution impregnated in the separator 23. Meanwhile, at the time of discharging, lithium ions are released from, for example, the negative electrode 22, and absorbed in the positive electrode 21 via the electrolyte solution impregnated in the separator 23.

For this non-aqueous electrolyte battery, an open circuit voltage (that is, battery voltage) at the time of complete charge may be set to, for example, not less than 2.80 V and not more than 6.00 V, not less than 3.60 V and not more than 6.00 V, favorably not less than 4.25 V and not more than 6.00 V, not less than 4.20 V and not more than 4.50 V, more favorably not less than 4.30 V and not more than 4.55 V. In the case where the open circuit voltage at the time of complete charge is set to not less than 4.25 V in a battery using a layered rock salt type lithium composite oxide or the like as the positive electrode active material, because the amount of lithium released per unit mass increases even with the same positive electrode active material as compared with a battery with the open circuit voltage of 4.20 V, the amounts of the positive electrode active material and the negative electrode active material are adjusted depending thereon, thereby obtaining a high energy density.

(2-2) Method of Producing Non-Aqueous Electrolyte Battery

This non-aqueous electrolyte battery is produced by the following procedures, for example.

First, the positive electrode 21 is produced. First, a positive electrode active material and, if necessary, a binding agent, a conductive agent, and the like are mixed to obtain a positive electrode mixture, which is then dispersed in, for example, an organic solvent to obtain a paste-like positive electrode mixture slurry. Next, the positive electrode mixture slurry is uniformly applied to both surfaces of the positive electrode current collector 21A and then dried to form the positive electrode active material layer 21B. Finally, the positive electrode active material layer 21B is compression-molded by using a roll press machine or the like while heating as necessary. In this case, compression molding may be repeated a plurality of times.

Next, the negative electrode 22 is produced by the same procedure as that for the above-mentioned positive electrode 21. In this case, a negative electrode mixture obtained by mixing a negative electrode active material and, if necessary, a binding agent, a conductive agent, and the like is dispersed in, for example, an organic solvent to obtain a paste-like negative electrode mixture slurry. After that, the negative electrode mixture slurry is uniformly applied to both surfaces of the negative electrode current collector 22A to form the negative electrode active material layer 22B, and then the negative electrode active material layer 22B is compression-molded.

Note that the negative electrode 22 may be produced by a procedure different from that of the positive electrode 21. In this case, first, a negative electrode material is deposited on both surfaces of the negative electrode current collector 22A by using a vapor phase method such as a vapor deposition method to form a plurality of negative electrode active material particles. After that, as necessary, an oxide-containing film is formed by using a liquid phase method such as a liquid phase precipitation method, a metal material is formed by using a liquid phase method such as an electrolytic plating method, or both of them are formed, thereby forming the negative electrode active material layer 22B.

Finally, a non-aqueous electrolyte battery is assembled using the positive electrode 21 and the negative electrode 22. First, the positive electrode lead 25 is attached to the positive electrode current collector 21A by welding or the like, and the negative electrode lead 26 is attached to the negative electrode current collector 22A by welding or the like. Next, the positive electrode 21 and the negative electrode 22 are laminated and wound via the separator 23 to produce the wound electrode body 20, and then, the center pin 24 is inserted in the winding center. Next, the wound electrode body 20 is housed inside the battery can 11 while being sandwiched between the pair of insulating plates 12 and 13. In this case, the tip portion of the positive electrode lead 25 is attached to the safety valve mechanism 15 by welding or the like, and the tip portion of the negative electrode lead 26 is attached to the battery can 11 by welding or the like. Next, an electrolyte solution is injected into the battery can 11 and impregnated in the separator 23. Finally, the battery lid 14, the safety valve mechanism 15, and the heat sensitive resistance element 16 are caulked at an opening end portion of the battery can 11 via the gasket 17. As a result, the non-aqueous electrolyte battery shown in FIG. 1 to FIG. 2 is completed.

3. Third Embodiment

A battery according to a third embodiment of the present technology will be described. This battery uses the above-mentioned electrolyte solution. This battery is, for example, a non-aqueous electrolyte battery, a secondary battery that is capable of charging and discharging, and a lithium metal secondary battery in which the capacity of the negative electrode is represented by precipitation and dissolution of lithium metal. This non-aqueous electrolyte battery has a configuration similar to that of the non-aqueous electrolyte battery according to the second embodiment except that the negative electrode active material layer 22B is formed of lithium metal, and is produced by a procedure similar to that for the non-aqueous electrolyte battery according to the second embodiment In this non-aqueous electrolyte battery, lithium metal (Li) is used as a negative electrode active material, thereby achieving a high energy density. The negative electrode active material layer 22B may already exist from the time of assembly. However, the negative electrode active material layer 22B does not necessarily need to exist from the time of assembly, and may be formed of lithium metal precipitated at the time of charging. Further, the negative electrode current collector 22A may be omitted by using the negative electrode active material layer 22B also as a current collector.

[Operation of Non-Aqueous Electrolyte Battery]

In this non-aqueous electrolyte battery, when charge is performed, for example, lithium ions are released from the positive electrode 21 and precipitated as lithium metal on the surface of the negative electrode current collector 22A via the electrolyte solution impregnated in the separator 23. Meanwhile, when discharge is performed, for example, lithium metal is eluted from the negative electrode active material layer 22B as lithium ions and is absorbed in the positive electrode 21 via the electrolyte solution impregnated in the separator 23.

In accordance with the non-aqueous electrolyte battery according to the third embodiment, in the case where the capacity of the negative electrode 22 is represented by precipitation and dissolution of lithium metal, the non-aqueous electrolyte battery is provided with the above-mentioned electrolyte solution. Therefore, by the same operation as that of the non-aqueous electrolyte battery according to the second embodiment, it is possible to suppress the increase in resistance at the time of storing.

4. Fourth Embodiment

A battery according to a fourth embodiment of the present technology will be described. This battery uses the above-mentioned electrolyte solution. This battery is, for example, a non-aqueous electrolyte battery, a secondary battery that is capable of charging and discharging, and a lithium ion secondary battery in which the capacity of the negative electrode is represented by absorption and release of lithium ions as electrode reactive materials.

(4-1) Configuration of Non-Aqueous Electrolyte Battery

Figure 3:
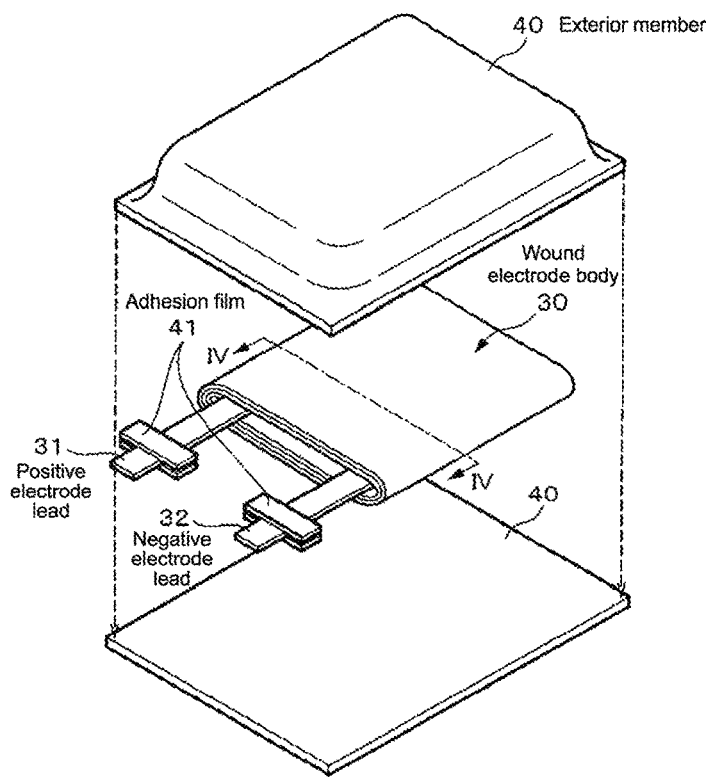
FIG. 3 is an exploded perspective view showing the configuration of the battery according to the embodiment of the present technology.
Figure 4:
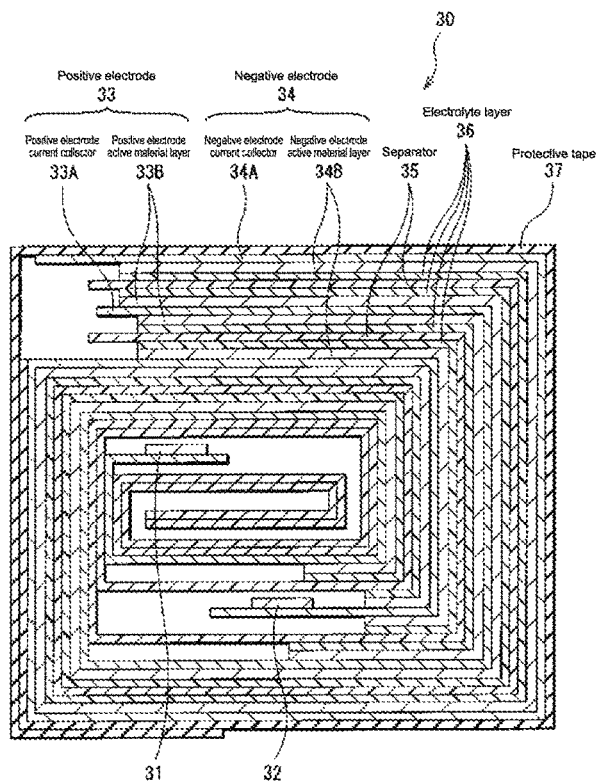
FIG. 4 is a cross-sectional view of the wound electrode body shown in FIG. 3.

FIG. 3 shows an exploded perspective configuration of a non-aqueous electrolyte battery according to the fourth embodiment of the present technology, and FIG. 4 is an enlarged cross-sectional view taken along the line IV-IV of a wound electrode body 30 shown in FIG. 3. In this non-aqueous electrolyte battery, the wound electrode body 30 to which mainly a positive electrode lead 31 and a negative electrode lead 32 are attached is housed inside a film-like exterior member 40. A battery structure using the exterior member 40 is called a laminated film type.

For example, the positive electrode lead 31 and the negative electrode lead 32 are led out from the inside of the exterior member 40 to the outside in the same direction. However, the installation positions of the positive electrode lead 31 and the negative electrode lead 32 with respect to the wound electrode body 30, the lead-out directions thereof, and the like are not particularly limited. The positive electrode lead 31 is formed of, for example, aluminum, and the negative electrode lead 32 is formed of, for example, copper, nickel, or stainless. These materials have a shape of, for example, a thin plate or mesh.

(Exterior Member)

The exterior member 40 is, for example, a deformable film-like exterior member, and a laminated film in which a fusion layer, a metal layer, and a surface protective layer are laminated in the stated order. In this case, for example, outer edges of the fusion layers of the two films are adhered to each other by fusion, an adhesive, or the like so that the fusion layer faces the wound electrode body 30. Examples of the fusion layer include a film formed of polyethylene, polypropylene, or the like. Examples of the metal layer include an aluminum foil. Examples of the surface protective layer include a film formed of nylon, polyethylene terephthalate, or the like.

Among them, as the exterior member 40, an aluminum laminated film in which a polyethylene film, an aluminum foil, and a nylon film are laminated in the stated order is favorable. Note that the exterior member 40 may be a laminated film having another laminated structure, a polymer film formed of polypropylene, or a metal film, instead of the aluminum laminated film.

An adhesion film 41 for preventing the intrusion of outside air is inserted between the exterior member 40, the positive electrode lead 31, and the negative electrode lead 32. This adhesion film 41 is formed of a material having adhesiveness to the positive electrode lead 31 and the negative electrode lead 32. Examples of such a material include polyolefin resin such as polyethylene, polypropylene, modified polyethylene, and modified polypropylene.

(Positive Electrode, Negative Electrode, and Separator)

The wound electrode body 30 is obtained by laminating and winding a positive electrode 33 and a negative electrode 34 via a separator 35 and an electrolyte layer 36. The outermost peripheral portion of the wound electrode body 30 is protected by a protective tape 37. The positive electrode 33 is obtained by providing, for example, a positive electrode active material layer 33B on both surfaces of a positive electrode current collector 33A. The configurations of the positive electrode current collector 33A and the positive electrode active material layer 33B are respectively similar to those of the positive electrode current collector 21A and the positive electrode active material layer 21B in the non-aqueous electrolyte battery according to the second embodiment. The negative electrode 34 is obtained by providing, for example, providing a negative electrode active material layer 34B on both surfaces of a negative electrode current collector 34A. The configurations of the negative electrode current collector 34A and the negative electrode active material layer 34B are respectively similar to those of the negative electrode current collector 22A and the negative electrode active material layer 22B in the non-aqueous electrolyte battery according to the second embodiment.

Note that the configuration of the separator 35 is similar to that of the separator 23 in the non-aqueous electrolyte battery according to the second embodiment.

(Electrolyte Layer)

The electrolyte layer 36 is obtained by holding an electrolyte solution with a polymer compound, and may contain other materials such as various additives as necessary. This electrolyte layer 36 is, for example, a so-called gel electrolyte. The gel electrolyte is favorable because a high ionic conductivity (e.g., 1 mS/cm or more at room temperature) can be achieved and leakage of the electrolyte solution can be prevented.

Examples of the polymer compound include at least one of the following polymer materials. Examples of the polymer materials include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Examples of the polymer materials include polyvinyl acetate, polyvinyl alcohol, polymethylmethacrylate, polyacrylic acid, polymethacrylic acid, styrene-butadiene rubber, nitrile-butadiene rubber, polystyrene, and polycarbonate. Examples of the polymer materials include a copolymer of vinylidene fluoride and hexafluoropyrene. These may be used alone or a plurality of them may be mixed. Among them, polyvinylidene fluoride or a copolymer of vinylidene fluoride and hexafluoropyrene is favorable. This is because they are electrochemically stable.

The electrolyte solution is similar to that of the electrolyte solution according to the first embodiment. Note that in the electrolyte layer 36 that is a gel electrolyte, the solvent of the electrolyte solution represents a wide concept including not only a liquid solvent but also a substance that has ionic conductivity and is capable of dissociating an electrolyte salt. Therefore, when a polymer compound having ion conductivity is used, the polymer compound is also included in the solvent.

Note that instead of the gel electrolyte layer 36 in which the electrolyte solution is held by the polymer compound, the electrolyte solution may be used as it is. In this case, the separator 35 is impregnated with the electrolyte solution.

(Electrolyte Layer Containing Particles)

The electrolyte layer 36 may contain particles of at least one of inorganic particles and organic particles from the viewpoint of obtaining more excellent effects. Specifically, the electrolyte layer 36 may contain metal oxides, metal oxide hydrates, metal hydroxides, metal nitrides, metal carbides, metal sulfides, or the like, which are electrically insulating inorganic particles. Examples of metal oxides or metal oxide hydrates that can be suitably used include aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), and zinc oxide (ZnO). Examples of metal nitrides that can be suitably used include silicon nitride ($Si_3Ni_4$), aluminum nitride (AlN), boron nitride (BN), titanium nitride (TiN) and the like. Examples of metal carbides that can be suitably used include silicon carbide (SiC) and boron carbide ($B_4C$). Examples of metal sulfides that can be suitably used include barium sulfate ($BaSO_4$). Examples of metal hydroxides that can be used include aluminum hydroxide ($Al(OH)_3$) and the like. Further, a porous aluminosilicate such as zeolite ($M_{2/n}O \cdot Al_2O_3 \cdot xSiO_2 \cdot yH_2O$, M is a metal element, $x \geq 2$, $y \geq 0$), a layer silicate such as talc ($Mg_3Si_4O_{10}(OH)_2$), or a mineral such as barium titanate ($BaTiO_3$) and strontium titanate ($SrTiO_3$) may also be used. Further, a lithium compound such as $Li_2O_4$, $Li_3Po_4$, and LiF may also be used. A carbon material such as graphite, carbon nanotube, and diamond may also be used. Among these materials, it is favorable to use alumina, boehmite, talc, titania (especially one having rutile structure), silica, or magnesia. It is more favorable to use alumina or boehmite.

These inorganic particles may be used singly or in mixtures of two or more thereof. The shape of the inorganic particles is not limited in particular, and those having any of a spherical shape, a fiber shape, an acicular shape, a scale-like shape, a plate shape, random shapes, and the like, may be employed.

Examples of materials constituting the organic particles include a fluorine-containing resin such as polyvinylidene fluoride and polytetrafluoroethylene, a fluorine-containing rubber such as vinylidene fluoride-tetrafluoroethylene copolymer and ethylene-tetrafluoroethylene copolymer, styrene-butadiene copolymer and hydrides thereof, acrylonitrile-butadiene copolymer and hydrides thereof, acrylonitrile-butadiene-styrene copolymer and hydrides thereof, methacrylic ester-acrylic ester copolymer, styrene-acrylic ester copolymer, acrylonitrile-acrylic ester copolymer, rubbers such as ethylene propylene rubber, polyvinyl alcohol, polyvinyl acetate, and the like, cellulose derivatives such as ethyl cellulose, methyl cellulose, hydroxyethyl cellulose and carboxymethyl cellulose, polyphenylene ether, polysulfone, polyether sulfone, polyphenylene sulfide, polyetherimide, polyimide, polyamide such as wholly aromatic polyamide (aramid), polyamideimide, polyacrylonitrile, polyvinyl alcohol, polyether, an acrylate resin, polyester, and other resins having high heat resistance where at least one temperature of a melting point and a glass-transition temperature is equal to or higher than 180° C. These materials may be used alone or two or more of them may be mixed and used. The shape of the organic particles is not limited in particular, and those having any of a spherical shape, a fiber shape, an acicular shape, a scale-like shape, a plate shape, random shapes, and the like, may be employed.

[Operation of Non-Aqueous Electrolyte Battery]

In this non-aqueous electrolyte battery, at the time of charging, for example, lithium ions are released from the positive electrode 33 and absorbed in the negative electrode 34 via the electrolyte layer 36. Meanwhile, at the time of discharging, for example, lithium ions are released from the negative electrode 34 and absorbed in the positive electrode 33 via the electrolyte layer 36.

(4-2) Method of Producing Non-Aqueous Electrolyte Battery

The non-aqueous electrolyte battery is produced by, for example, the following three kinds of procedures.

In a first production method, first, the positive electrode 33 and the negative electrode 34 are produced by a production procedure similar to that for the positive electrode 21 and the negative electrode 22 in the non-aqueous electrolyte battery according to the second embodiment. Specifically, the positive electrode 33 is produced by forming the positive electrode active material layer 33B on both surfaces of the positive electrode current collector 33A, and the negative electrode active material layer 34B is formed on both surfaces of the negative electrode current collector 34A to produce the negative electrode 34. Next, a precursor solution containing an electrolyte solution, a polymer compound, and a solvent is prepared and applied to the positive electrode 33 and the negative electrode 34, and then, the solvent is volatilized to form the gel electrolyte layer 36. Next, the positive electrode lead 31 is attached to the positive electrode current collector 33A by welding or the like, and the negative electrode lead 32 is attached to the negative electrode current collector 34A by welding or the like. Next, the positive electrode 33 and the negative electrode 34 on which the electrolyte layer 36 is formed are laminated and wound via the separator 35, and then, the protective tape 37 is adhered to the outermost peripheral portion of thereof, thereby producing the wound electrode body 30. Finally, after the wound electrode body 30 is sandwiched between the two film-like exterior member 40, outer edge portions of the exterior members 40 are adhered to each other by thermal fusion or the like to seal the wound electrode body 30. At this time, the adhesion film 41 is inserted between the positive electrode lead 31 and the negative electrode lead 32 and the exterior member 40. As a result, the non-aqueous electrolyte battery shown in FIG. 3 and FIG. 4 is completed.

In a second production method, first, the positive electrode lead 31 is attached to the positive electrode 33, and the negative electrode lead 32 is attached to the negative electrode 34. Next, the positive electrode 33 and the negative electrode 34 are laminated and wound via the separator 35, and then the protective tape 37 is adhered to the outermost peripheral portion thereof, thereby producing a wound body that is a precursor of the wound electrode body 30. Next, after the wound body is sandwiched between the two film-shaped exterior members 40, the remaining outer peripheral edge portion excluding the outer peripheral edge portion on one side is adhered by thermal fusion or the like, and the wound body is housed inside the bag-like exterior member 40. Next, a composition for an electrolyte containing an electrolyte solution, a monomer as a raw material of a polymer compound, a polymerization initiator, and, if necessary, another material such as a polymerization inhibitor, is prepared and injected into the bag-like exterior member 40, and then, the opening of the exterior member 40 is hermetically sealed by thermal fusion or the like. Finally, the monomer is thermally polymerized into a polymer compound to form the gel electrolyte layer 36. As a result, the non-aqueous electrolyte battery is completed.

In a third production method, first, a wound body is formed and housed inside a bag-like exterior member 40, similarly to the above-mentioned second production method except that the separator 35 having both surfaces on which a polymer compound is applied is used. Examples of the polymer compound applied to the separator 35 include a polymer (homopolymer, copolymer, multi-component copolymer, or the like) containing a vinylidene fluoride as a component. Specifically, examples of the polymer compound include a binary copolymer containing a polyvinylidene fluoride or a vinylidene fluoride and hexafluoropropylene as components, and a ternary copolymer containing a vinylidene fluoride, a hexafluoropropylene, and a chlorotrifluoroethylene as components. Note that the polymer compound may contain one or more other polymer compounds together with the above-mentioned polymer containing a vinylidene fluoride as a component. Next, an electrolyte solution is prepared and injected into the exterior member 40, and then the opening of the exterior member 40 is hermetically sealed by thermal fusion or the like. Finally, the exterior member 40 is heated while adding additional weight thereto, and the separator 35 is brought into close contact with the positive electrode 33 and the negative electrode 34 via the polymer compound. As a result, the polymer compound is impregnated with the electrolyte solution, and the polymer compound is gelled to form the electrolyte layer 36, thereby completing the non-aqueous electrolyte battery.

In this third production method, battery swelling is suppressed as compared with the first production method. Further, in the third production method, the monomer, which is the raw material of the polymer compound, the solvent, and the like, are hardly left in the electrolyte layer 36, and the process of forming the polymer compound is favorably controlled, as compared with the second production method. Therefore, sufficient adhesion can be achieved between the positive electrode 33, the negative electrode 34, and the separator 35, and the electrolyte layer 36

In accordance with the non-aqueous electrolyte battery according to the fourth embodiment, in the case where the capacity of the negative electrode 34 is represented by absorption and release of lithium ions, the electrolyte layer 36 contains the above-mentioned electrolyte (electrolyte solution). Therefore, by the same operation as that of the non-aqueous electrolyte battery according to the second embodiment, it is possible to suppress the increase in resistance at the time of storing. Other effects of this non-aqueous electrolyte battery are similar to those of the non-aqueous electrolyte battery according to the second embodiment. Note that the non-aqueous electrolyte battery according to the fourth embodiment does not necessarily need to have the same configuration as that of the non-aqueous electrolyte battery according to the second embodiment, and may have a configuration similar to that of the non-aqueous electrolyte battery according to the third embodiment. Also in this case, the similar effects can be obtained.

5. Fifth Embodiment

Figure 5:
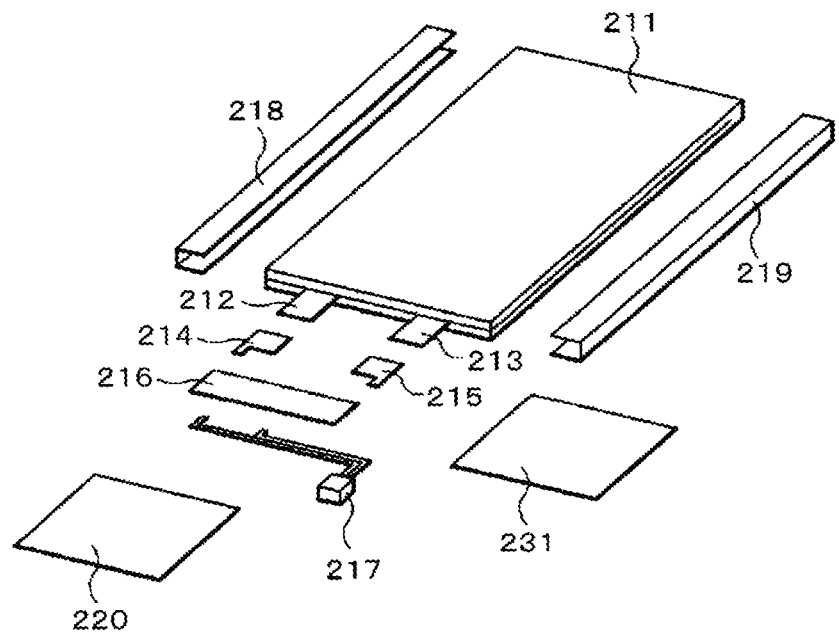
FIG. 5 is a perspective view showing a configuration of an application example (battery pack: single battery) of a secondary battery.
Figure 6:
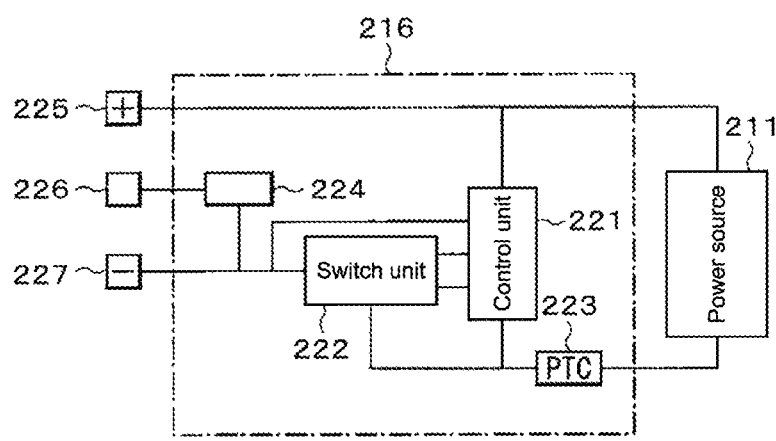
FIG. 6 is a block diagram showing a configuration of the battery pack shown in FIG. 5.

FIG. 5 shows a perspective configuration of a battery pack using a single battery. FIG. 6 shows a block configuration of the battery pack shown in FIG. 5. Note that FIG. 5 shows the state where the battery pack is dissembled.

The battery pack described here is a simplified type battery pack (so-called soft pack) using one secondary battery, and is built in, for example, an electronic apparatus typified by a smartphone. As shown in FIG. 5, for example, this battery pack includes a power source 211 as a laminated film type secondary battery similar to that of the fourth embodiment, and a circuit board 216 connected to the power source 211.

A pair of adhesive tapes 218 and 219 is attached to both side surfaces of the power source 211. On the circuit board 216, a protection circuit (PCM: Protection Circuit Module) is formed. The circuit board 216 is connected to a positive electrode lead 212 and a negative electrode lead 213 of the power source 211 via a pair of tabs 214 and 215, and also to a lead 217 with a connector for external connection. Note that in the state where the circuit board 216 is connected to the power source 211, the circuit board 216 is protected from above and below by a label 220 and an insulating sheet 231. By attaching this label 220, the circuit board 216, the insulating sheet 231, and the like are fixed.

Further, as shown in FIG. 6, for example, the battery pack includes the power source 211 and the circuit board 216. The circuit board 216 includes, for example, a control unit 221, a switch unit 222, a PTC 223, and a temperature detection unit 224. Because the power source 211 can be connected to the outside via a positive electrode terminal 225 and a negative electrode terminal 227, the power source 211 is charged and discharged via the positive electrode terminal 225 and the negative electrode terminal 227. The temperature detection unit 224 is capable of detecting the temperature using a temperature detection terminal (so-called T terminal) 226.

The control unit 221 controls the operation of the entire battery pack (including the use state of the power source 211), and includes a central processing unit (CPU), a memory, and the like.

For example, when the battery voltage reaches the overcharge detection voltage, the control unit 221 disconnects the switch unit 222 so that no charging current flows through the current path of the power source 211. Further, for example, when a large amount of current flows during charging, the control unit 221 disconnects the switch unit 222 and cuts off the charging current.

In addition thereto, for example, when the battery voltage reaches the overdischarge detection voltage, the control unit 221 disconnects the switch unit 222 so that no discharge current flows through the current path of the power source 211. Further, for example, when a large amount of current flows during discharging, the control unit 221 cuts off the discharge current by disconnecting the switch unit 222.

Note that the overcharge detection voltage of the secondary battery is, for example, 4.20 V±0.05 V, and the overdischarge detection voltage is, for example, 2.4 V±0.1 V.

The switch unit 222 switches the use state of the power source 211 (availability of the connection between the power source 211 and an external apparatus) according to an instruction from the control unit 221. This switch unit 222 includes a charge control switch, a discharge control switch, and the like. The charge control switch and the discharge control switch are, for example, semiconductor switches such as field effect transistors (MOSFETs) using a metal oxide semiconductor. Note that the charge/discharge current is detected based on, for example, the ON resistance of the switch unit 222.

The temperature detection unit 224 measures the temperature of the power source 211, outputs the measurement result to the control unit 221, and includes, for example, a temperature detection element such as a thermistor. Note that the measurement result by the temperature detection unit 224 is used in the case where the control unit 221 performs charge and discharge control at the time of abnormal heat generation or where the control unit 221 performs correction processing at the time of calculation of the remaining capacity, or the like.

Note that the circuit board 216 does not necessary need to include the PTC 223. In this case, a separate PTC element may be attached to the circuit board 216.

6. Sixth Embodiment

Figure 7:
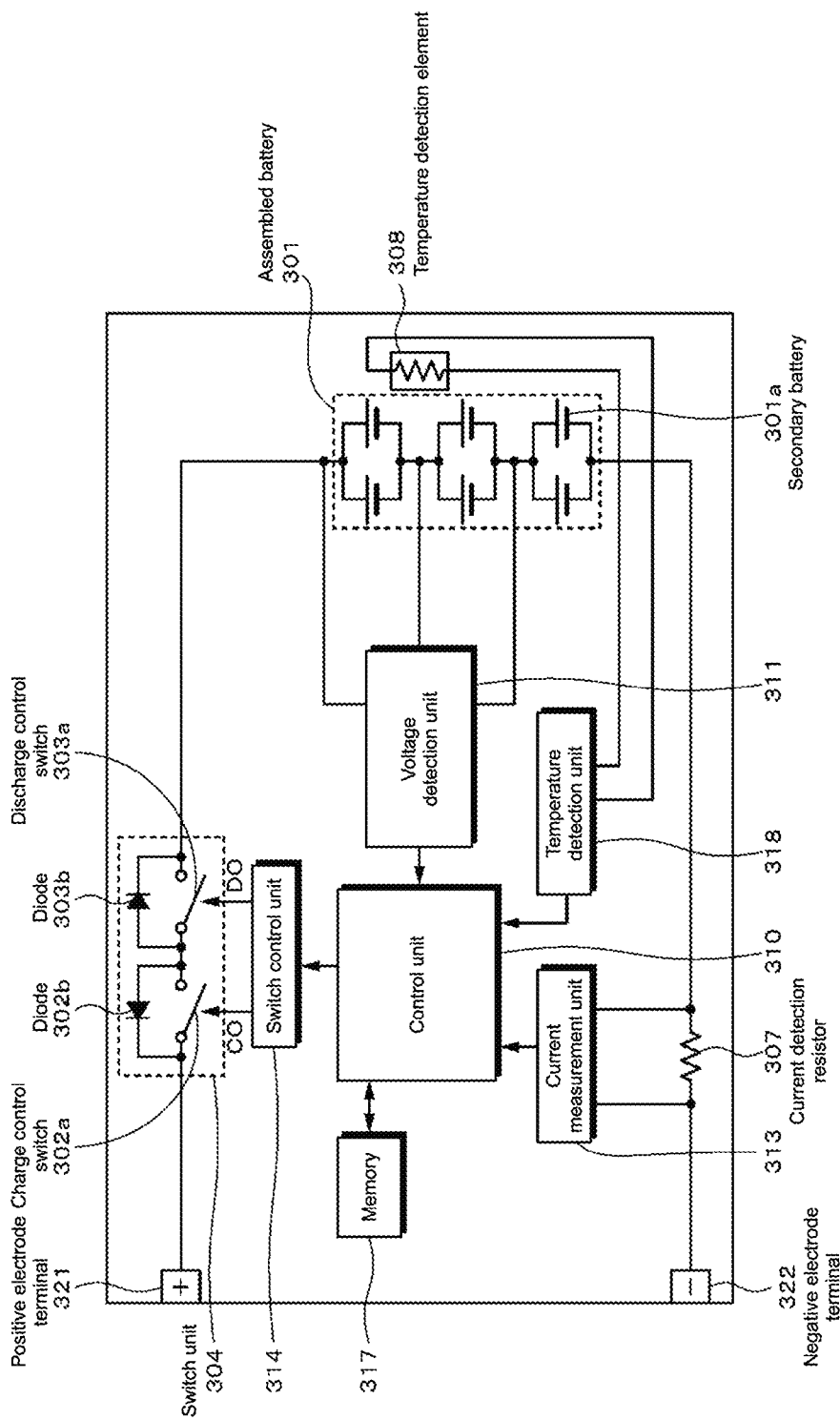
FIG. 7 is a block diagram showing a circuit configuration example of a battery pack according to the embodiment of the present technology.

FIG. 7 is a block diagram showing a circuit configuration example of a case where the battery of the second to fourth embodiments of the present technology (hereinafter also referred to as "secondary battery", as appropriate) is applied to a battery pack. The battery pack includes an assembled battery 301, an exterior, a switch unit 304 having a charge control switch 302a and a discharge control switch 303a, a current detection resistor 307, a temperature detection element 308, and a control unit 310.

Further, the battery pack includes a positive electrode terminal 321 and a negative electrode lead 322. In charging, the positive electrode terminal 321 and the negative electrode lead 322 are respectively connected to a positive electrode terminal and a negative electrode terminal of a charger, and the charging is carried out. Further, when using an electronic apparatus, the positive electrode terminal 321 and the negative electrode lead 322 are respectively connected to a positive electrode terminal and a negative electrode terminal of the electronic apparatus, and the discharge is carried out.

The assembled battery 301 is configured with a plurality of the secondary batteries 301a connected to one another in series and/or in parallel. The secondary battery 301a is a secondary battery of an embodiment of the present technology. Note that although a case where the six secondary batteries 301a are connected in two batteries in parallel and three in series (2P3S configuration) is shown in FIG. 7 as an example, any way of connections such as n in parallel and m in series (where n and m are integers) may be adopted.

The switch unit 304 includes a charge control switch 302a and a diode 302b, and a discharge control switch 303a and a diode 303b and is controlled by a control unit 310. The diode 302b has the polarity in opposite direction with respect to charge current flowing from the positive electrode terminal 321 to the assembled battery 301 and in forward direction with respect to discharge current flowing from the negative electrode lead 322 to the assembled battery 301. The diode 303b has the polarity in forward direction with respect to the charge current and in opposite direction with respect to the discharge current. Note that although in this example the switch unit 304 is provided on the positive electrode terminal side, it may otherwise be provided on the negative electrode terminal side.

The charge control switch 302a is turned off in the case where a battery voltage reaches an overcharge detection voltage, and it is controlled by the control unit such that the charge current does not flow in a current path of the assembled battery 301. After the charge control switch 302a is turned off, only discharge can be performed via the diode 302b. Further, in the case where a large amount of current flows during charging, the charge control switch 302a is turned off and is controlled by the control unit 310 such that the charge current flowing in the current path of the assembled battery 301 is shut off.

The discharge control switch 303a is turned off in the case where a battery voltage reaches an overdischarge detection voltage, and it is controlled by the control unit 310 such that the discharge current does not flow in a current path of the assembled battery 301. After the discharge control switch 303a is turned off, only charge can be performed via the diode 303b. Further, in the case where a large amount of current flows at a time of discharge, the discharge control switch 303a is turned off and is controlled by the control unit 310 such that the discharge current flowing in the current path of the assembled battery 301 is shut off.

A temperature detection element 308 is a thermistor, for example, provided in the vicinity of the assembled battery 301. The temperature detection element 308 measures a temperature of the assembled battery 301 and supplies the measured temperature to the control unit 310. A voltage detection unit 311 measures voltages of the assembled battery 301 and each of the secondary batteries 301a constituting the assembled battery 301, A/D-converts the measured voltages, and supplies them to the control unit 310. A current measurement unit 313 measures a current using a current detection resistor 307 and supplies the measured current to the control unit 310.

The switch control unit 314 controls the charge control switch 302a and the discharge control switch 303a of the switch unit 304 on the basis of the voltage and the current that are input from the voltage detection unit 311 and the current measurement unit 313. The switch control unit 314 transmits a control signal to the switch unit 304 when a voltage of any one of secondary batteries 301a reaches not more than the overcharge detection voltage or not more than the overdischarge detection voltage, or when a large amount of current flows rapidly, thereby preventing overcharge, overdischarge, and over-current charge and discharge.

Here, in the case where the secondary battery is a lithium-ion secondary battery, an overcharge detection voltage is defined to be 4.20 V±0.05 V, for example, and an overdischarge detection voltage is defined to be 2.4 V±0.1 V, for example.

For a charge and discharge control switch, a semiconductor switch such as a MOSFET) can be used. In this case, parasitic diodes of the MOSFET function as the diodes 302b and 303b. In the case where p-channel FETs are used as the charge and discharge control switch, the switch control unit 314 supplies a control signal DO and a control signal CO to a gate of the charge control switch 302a and a gate of the discharge control switch 303a, respectively. In the case where the charge control switch 302a and the discharge control switch 303a are of p-channel type, the charge control switch 302a and the discharge control switch 303a are turned on by a gate potential lower than a source potential by not less than a predetermined value. In other words, in normal charge and discharge operations, the control signals CO and DO are determined to be a low level, and the charge control switch 302a and the discharge control switch 303a are turned on.

Further, for example, when overcharged or overdischarged, the control signals CO and DO are determined to be a high level and the charge control switch 302a, and the discharge control switch 303a are turned off.

A memory 317 includes a RAM or a ROM, and include, for example, an EPROM (Erasable Programmable Read Only Memory) serving as a nonvolatile memory. In the memory 317, numerical values computed by the control unit 310, an internal resistance value of a battery in an initial state of each secondary battery 301a, which has been measured in a stage of a manufacturing process, and the like are stored in advance, and can be rewritten as appropriate. Further, when a full charge capacity of the secondary battery 301a is stored, for example, a remaining capacity can be calculated together with the control unit 310.

In a temperature detection unit 318, the temperature detection element 308 is used to measure the temperature, and control of charging or discharging when abnormal heat generation has occurred, or correction in calculation of the remaining capacity is performed.

7. Seventh Embodiment

The above-mentioned batteries according to the second to fourth embodiments of the present technology and the battery packs according to the fifth and sixth embodiments can be installed in or used for providing power to an apparatus such as an electronic apparatus, an electric vehicle and a power storage apparatus, for example.

Examples of the electronic apparatus include laptops, smartphones, tablet terminals, PDA (Personal Digital Assistant), cellular phones, wearable tablets, cordless telephone handsets, video movies, digital still cameras, electronic books, electronic dictionaries, music players, radios, headphones, game machines, navigation systems, memory cards, pacemakers, hearing aids, electric tools, electric shavers, refrigerators, air conditioners, television receivers, stereos, water heaters, microwave ovens, dishwashers, washing machines, dryers, lighting equipment, toys, medical equipment, robots, load conditioners, and traffic lights.

Examples of the electric vehicle include railway vehicles, golf carts, electric carts, and electric automobiles (including hybrid automobiles). The batteries and the battery packs are used as their driving power source or auxiliary power source.

Examples of the power storage apparatus include power sources for electrical storage to be used by buildings such as houses or by power generation facilities.

Among the above-mentioned application examples, a specific example of a power storage system using a power storage apparatus to which the above-mentioned battery of the present technology is applied will be described below.

The power storage system may employ the following configurations, for example. A first power storage system is a power storage system having a power storage apparatus charged by a power generation apparatus that generates power from renewable energy. A second power storage system has a power storage apparatus, and provides power to an electronic apparatus connected to the power storage apparatus. A third power storage system is an electronic apparatus that receives power supply from a power storage apparatus. These power storage systems are realized as a system that efficiently supplies power in cooperation with an external power supply network.

Furthermore, a fourth power storage system is an electric vehicle including a converting apparatus that receives power supply from an power storage apparatus and converts the power into a driving force for a vehicle, and a control apparatus that performs information processing relating to vehicle control on the basis of information on the power storage apparatus. A fifth power storage system is an power system that includes a power information transmitting-receiving unit that transmits/receives signals to/from other apparatuses via a network and controls the charge and discharge of the above-mentioned power storage apparatus on the basis of information received by the transmitting-receiving unit. A sixth power storage system is a power system that receives power supply from the above-mentioned power storage apparatus or provides the power storage apparatus with power from a power generation apparatus or a power network. The power storage system will be described below.

(7-1) (Power Storage System in House as Application Example)

Figure 8:
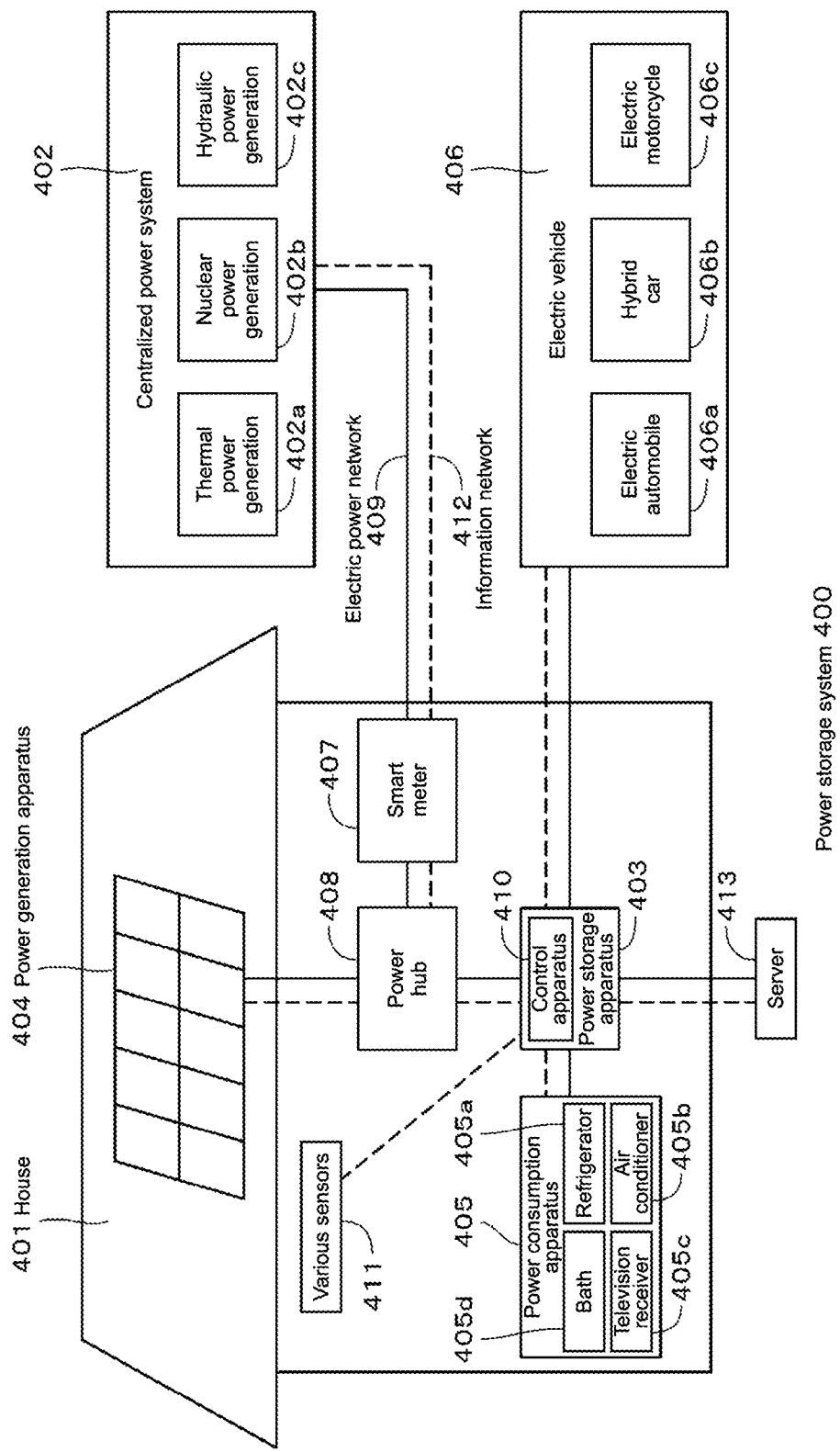
FIG. 8 is a schematic diagram showing an example in which the battery according to the present technology is applied to a power storage system for a house.

An example in which a power storage apparatus using the battery according to the present technology is applied to a power storage system for a house will be described with reference to FIG. 8. For example, in a power storage system 400 for a house 401, electric power is supplied from a centralized power system 402 such as a thermal power generation 402a, a nuclear power generation 402b, and a hydraulic power generation 402c to a power storage apparatus 403 via an electric power network 409, an information network 412, a smart meter 407, a power hub 408, and the like. In addition, electric power is supplied from an independent power source such as a domestic power generation apparatus 404 to the power storage apparatus 403. The electric power supplied to the power storage apparatus 403 is stored. The power storage apparatus 403 is used to supply electric power to be used in the house 401. It is not limited to the house 401, and a similar power storage system can be used for a building.

In the house 401, a power generation apparatus 404, a power consumption apparatus 405, the power storage apparatus 403, a control apparatus 410 that controls each apparatus, the smart meter 407, and sensors 411 that acquire various types of information are provided. The respective apparatuses are connected to one another via the electric power network 409 and the information network 412. As the power generation apparatus 404, a solar battery, a fuel battery, and the like are used. The generated electric power is supplied to the power consumption apparatus 405 and/or the power storage apparatus 403. The power consumption apparatus 405 includes, for example, a refrigerator 405a, an air conditioner 405b that is an air conditioning apparatus, a television receiver 405c, and a bath 405d. Further, the power consumption apparatus 405 includes an electric vehicle 406. The electric vehicle 406 is an electric automobile 406a, a hybrid car 406b, or an electric motorcycle 406c.

The battery according to the present technology is applied to the power storage apparatus 403. The battery according to the present technology may be formed of the above-mentioned lithium ion secondary battery. The smart meter 407 has a function of monitoring the amount of use of commercial electric power and transmitting the measured amount of use to an electric power company. The power supply of the electric power network 409 may be any one of direct-current power supply, alternating current power supply, and non-contact power supply or combination thereof.

Examples of the various sensors 411 include a motion sensor, an illuminance sensor, an object detection sensor, a power consumption sensor, a vibration sensor, a contact sensor, a temperature sensor, and an infrared sensor. The information acquired by the various sensors 411 is transmitted to the control apparatus 410. On the basis of the information from the sensors 411, a weather state, a person state, and the like are grasped, and it is possible to minimize the energy consumption by automatically controlling the power consumption apparatus 405. Further, the control apparatus 410 is capable of transmitting information on the house 401 to the external electric power company and the like via the Internet.

The power hub 408 executes processing such as branching of a power line and direct current/alternating current conversion. Examples of the communication system of the information network 412 connected to the control apparatus 410 include a method of using a communication interface such as a UART (Universal Asynchronous Receiver-Transceiver: transmission/reception circuit for asynchronous serial communication), and a method of using a sensor network that conforms to wireless communication standards such as Bluetooth, ZigBee, and Wi-Fi. The Bluetooth system is applied to multimedia communication, and one-to-many connection communication can be performed. ZigBee uses the physical layer of IEEE (Institute of Electrical and Electronics Engineers) 802.15.4. The IEEE802.15.4 is a name of a short-range wireless network standard called PAN (Personal Area Network) or W (Wireless) PAN.

The control apparatus 410 is connected to an external server 413. This server 413 may be managed by any one of the house 401, the electric power company, and a service provider. Information transmitted/received to/from the server 413 is, for example, power consumption information, life pattern information, electric power charge, weather information, disaster information, or information on power transaction. Such information may be transmitted/received to/from the domestic power consumption apparatus (e.g., television receiver). However, it may be transmitted/received to/from an apparatus (e.g., mobile phone) outside the house. Such information may be displayed on an apparatus having a display function such as a television receiver, a mobile phone, and a PDA (Personal Digital Assistants).

The control apparatus 410 that controls the respective blocks includes a CPU (Central Processing Unit), a RAM (Random Access Memory), a ROM (Read Only Memory), and the like, and is stored in the power storage apparatus 403 in this example. The control apparatus 410 is connected to the power storage apparatus 403, the domestic power generation apparatus 404, the power consumption apparatus 405, the various sensors 411, and the server 413 via the information network 412. The control apparatus 410 has a function of adjusting the amount of use of commercial electric power and the amount of power generation, for example. Note that the control apparatus 410 may additionally have a function of performing power transaction in a power market, for example.

As described above, electric power generated not only by the centralized power system 402 such as the thermal power generation 402a, the nuclear power generation 402b, and the hydraulic power generation 402c but also by the domestic power generation apparatus 404 (solar power generation, wind power generation) can be stored in the power storage apparatus 403. Therefore, even when the amount of electric power generated by the domestic power generation apparatus 404 fluctuates, it is possible to perform control, e.g., keep the amount of electric power transmitted to the outside constant or discharge only a necessary amount of electric power. For example, a possible method is to store electric power obtained by solar power generation in the power storage apparatus 403, and store cheaper midnight electric power in the power storage apparatus 403 at night and use the electric power stored in the power storage apparatus 403 by discharging it in the daytime when power is more expensive.

Note that although the example in which the control apparatus 410 is housed in the power storage apparatus 403 has been described in this example, the control apparatus 410 may be housed in the smart meter 407 or may be independently configured. Further, the power storage system 400 may be used for a plurality of houses in an apartment building or for a plurality of detached houses.

(7-2) Power Storage System in Vehicle as Application Example

Figure 9:
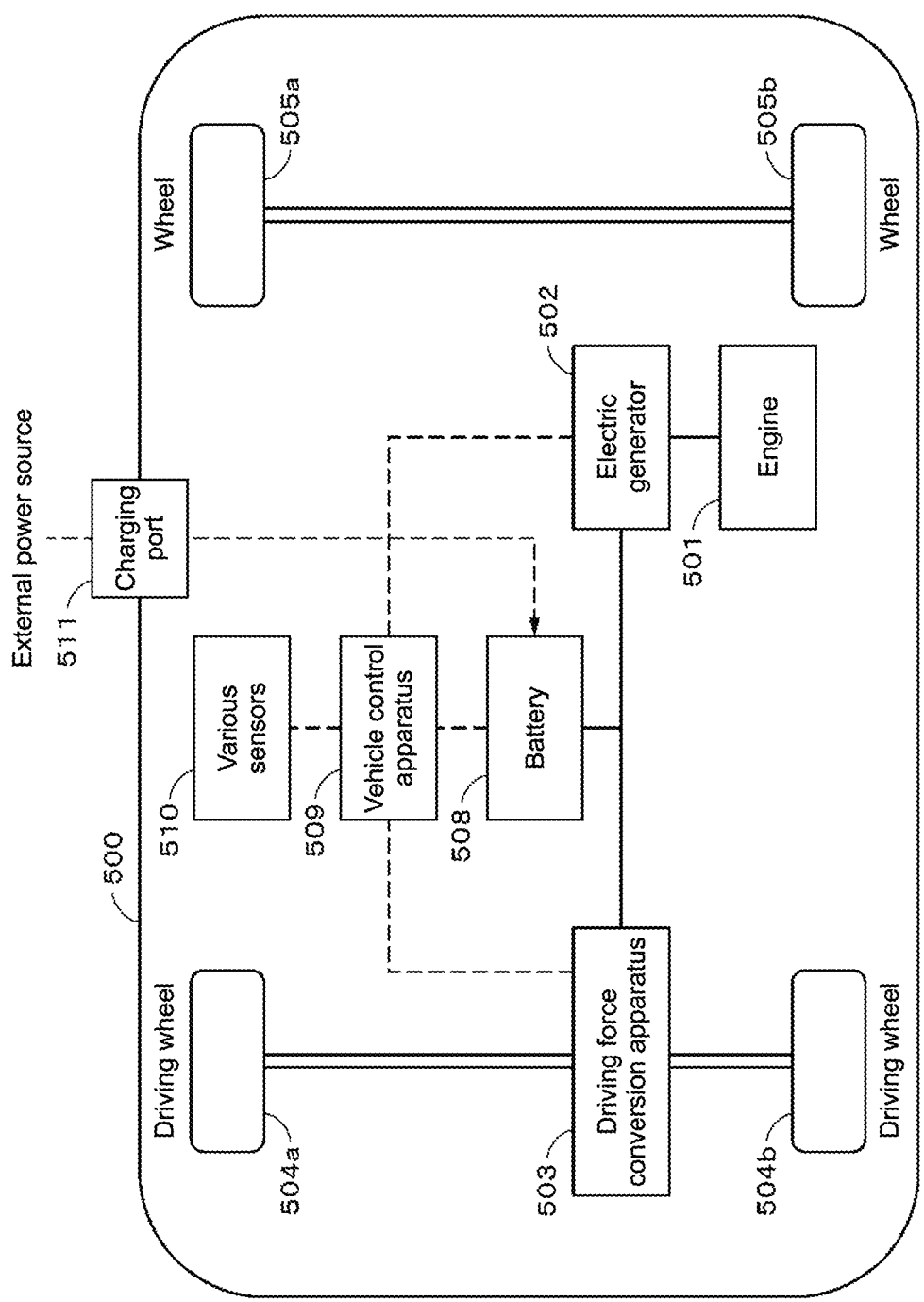
FIG. 9 is a schematic diagram schematically showing an example of a configuration of a hybrid vehicle that employs a series hybrid system to which the present technology is applied.

An example in which the present technology is applied to a power storage system for a vehicle will be described with reference to FIG. 9. FIG. 9 schematically shows an example of the configuration of a hybrid vehicle that employs a series hybrid system to which the present technology is applied. A vehicle of the series hybrid system runs with an electric power/driving force conversion apparatus by using electric power generated in an electric generator driven by an engine or electric power temporarily stored in a battery.

This hybrid vehicle 500 includes an engine 501, an electric generator 502, an electric power/driving force conversion apparatus 503, a driving wheel 504a, a driving wheel 504b, a wheel 505a, a wheel 505b, a battery 508, a vehicle control apparatus 509, various sensors 510, and a charging port 511. The above-mentioned battery according to the present technology is applied to the battery 508.

The hybrid vehicle 500 runs by using the electric power/driving force conversion apparatus 503 as a power source. An example of the electric power/driving force conversion apparatus 503 is a motor. The electric power/driving force conversion apparatus 503 is actuated due to electric power of the battery 508 and torque of the electric power/driving force conversion apparatus 503 is transmitted to the driving wheels 504a and 504b. Note that the electric power/driving force conversion apparatus 503 can be applied as both of an alternating-current motor and a direct-current motor by using direct current-alternating current (DC-AC) or reverse conversion (AC-DC conversion) at a necessary portion. The various sensors 510 controls r.p.m. of the engine via the vehicle control apparatus 509, opening (throttle opening) of a throttle valve (not shown), and the like. The various sensors 510 include a velocity sensor, an acceleration sensor, an engine r.p.m. sensor, and the like.

The torque of the engine 501 is transmitted to the electric generator 502, and electric power generated with the torque by the electric generator 502 can be stored in the battery 508.

When the hybrid vehicle 500 is decelerated by a braking mechanism (not shown), resistance force at the time of the deceleration is added to the electric power/driving force conversion apparatus 503 as torque, and regenerative electric power generated with this torque by the electric power/driving force conversion apparatus 503 is stored in the battery 508.

By being connected to a power source outside the hybrid vehicle 500, the battery 508 is also capable of receiving electric power supply from the external power source by using the charging port 511 as an input port, and storing the received electric power.

Although not shown in the figure, an information processing apparatus that executes information processing relating to vehicle control on the basis of information on a secondary battery may be provided. Examples of such an information processing apparatus include an information processing apparatus that displays the remaining capacity of the battery on the basis of information on the remaining capacity of the battery.

Note that the series hybrid vehicle that runs with the motor by using electric power generated by the electric generator driven by the engine or electric power temporarily stored in the battery has been described above as an example. However, the present technology can be effectively applied also to a parallel hybrid vehicle that uses output of an engine and output of a motor as driving sources and appropriately switches three systems of running with only the engine, running with only the motor, and running with the engine and the motor for the use. Further, the present technology can be effectively applied also to a so-called electric vehicle, which does not use an engine and runs by driving of only a driving motor.

EXAMPLE

Hereinafter, the present technology will be described in detail by Examples. Note that the present technology is not limited to the configuration of the following Examples.

Example 1-1

(Production of Positive Electrode)

Ninety % by mass of lithium cobalt oxide ($LiCoO_2$) as a positive electrode active material, 5% by mass of carbon black as a conductive agent, and 5% by mass of polyvinylidene fluoride as a binding agent were mixed to obtain a positive electrode mixture, which is then dispersed in N-methyl-2-pyrrolidone (NMP) to obtain a paste-like positive electrode mixture slurry. The positive electrode mixture slurry was applied to both surfaces of a positive electrode current collector formed of a strip-shaped aluminum foil, dried, and then compression-molded by a roll press machine to form a positive electrode active material layer. After that, a positive electrode lead was attached to one end of the positive electrode current collector by welding.

(Production of Negative Electrode)

Ninety six % by mass of graphite as a negative electrode active material, 1.5% by mass of an acrylic acid modified product of a styrene-butadiene copolymer as a binding agent, 1.5% by mass of carboxymethyl cellulose, and an appropriate amount of water were stirred to prepare a negative electrode mixture slurry. Next, this negative electrode mixture slurry was uniformly applied to both surfaces of a negative electrode current collector formed of a strip-shaped copper foil, dried, and compression-molded to form a negative electrode active material layer. After that, the negative electrode lead was attached to one end of the negative electrode current collector by welding.

(Formation of Matrix Polymer Compound Layer)

An applying solution was prepared by dispersing polyvinylidene fluoride (PVdF) as a matrix polymer compound in N-methyl-2-pyrrolidone (NMP). This applying solution was applied both surfaces of a separator and then dried to remove NMP, thereby obtaining a separator having a matrix polymer compound layer formed thereon. As the separator, a microporous polyethylene separator was used.

(Preparation of Electrolyte Solution)

An electrolyte solution was prepared as follows. Ethylene carbonate (EC), propylene carbonate (PC), ethylmethyl carbonate (EMC), and vinylene carbonate (VC) are mixed at a mass ratio of (EC:PC:EMC:VC) 39:39:20:2 to prepare a non-aqueous solvent. Next, a compound represented by the formula (1-1) was added to the non-aqueous solvent, and then $LiPF_6$ was dissolved therein as an electrolyte salt so as to have the concentration of 1 mol/L. The content of the compound represented by the formula (1-1) was adjusted so that the mass percentage based on the total mass of the electrolyte solution was 1% by mass. In this way, an intended electrolyte solution was obtained.

(Assembly of Laminated Film Type Battery)

Next, a positive electrode, a negative electrode, and a separator having matrix polymer compound layer formed on both surfaces thereof were laminated in the order of a positive electrode, a separator, a negative electrode, and a separator, and wound many times in the longitudinal direction to have a flat shape, and then, a wound electrode body was formed by fixing the winding end portion with an adhesive tape.

Next, the wound electrode body was sandwiched between exterior members, and a lead-out sides of the positive electrode lead and the negative electrode lead around the wound electrode body and the other two sides were thermally fused. Note that a laminated film having a structure in which an aluminum foil is sandwiched between a pair of resin films was used as the exterior members.

After that, an electrolyte solution was injected into this, and the remaining one side was thermally fused and hermetically sealed under reduced pressure. At this time, the electrolyte solution was impregnated into the matrix polymer compound layer, and the matrix polymer compound was swollen to form a gel electrolyte (gel electrolyte layer). In this way, the laminated film type battery shown in FIG. 3 was produced. Note that this laminated film type battery was designed to adjust the amount of the positive electrode active material and the amount of the negative electrode active material so that the open circuit voltage (i.e., the battery voltage) at the time of complete charge becomes 4.5 V.

Examples 1-2 to 1-13

In Examples 1-2 to 1-13, laminate film type battery was produced similarly to Example 1-1, except that the compound shown in the following Table 1 was added instead of the compound represented by the formula (1-1).

Examples 1-14 to 1-20

In Examples 1-14 to 1-20, a laminated film type battery was produced similarly to Example 1-3 except that the addition amount of the compound represented by the formula (1-3) was changed as shown in Table 1 below.

Examples 1-21 to 1-29

In Examples 1-21 to 1-29, a laminate film type battery was produced similarly to Example 1-3 except that another compound (compound B) was further added as shown in the following Table 1.

Example 1-30

A non-aqueous solvent was prepared by mixing ethylene carbonate (EC), propylene carbonate (PC), and ethylmethyl carbonate (EMC) at a mass ratio of (EC:PC:EMC) 40:40:20. A laminated film type battery was produced similarly to Example 1-3 except for the above.

Example 1-31

A non-aqueous solvent was prepared by mixing ethylene carbonate (EC) and ethylmethyl carbonate (EMC) at a mass ratio of (EC:EMC) 50:50. A laminated film type battery was produced similarly to Example 1-3 except for the above.

Example 1-32

A non-aqueous solvent was prepared by mixing ethylene carbonate (EC) and ethylmethyl carbonate (EMC) at a mass ratio of (EC:EMC) 30:70. A laminated film type battery was produced similarly to Example 1-3 except for the above.

Comparative Example 1-1 to Comparative Example 1-10

In Comparative Examples 1-1 to 1-10, a laminated film type battery was produced similarly to Examples 1-3 and 1-21 to 1-29 except that the compound represented by the formula (1-3) was not added in the preparation of the electrolyte solution.

(Battery Evaluation: Measurement of Resistance Increase Rate after 100 Hours)

For each of the produced batteries, the resistance increase rate after 100 hours was measured as follows. Constant current and constant voltage charging was performed at 23° C. with a charging voltage of 4.5 V and a current of 0.2 C, and then stored in a charged state at 70° C. for 100 hours. In this operation, the battery resistance before storage (initial cell resistance) and the battery resistance after storage (cell resistance after storage) were measured, and the resistance increase rate was obtained by the following formula.

Resistance increase rate [%]={(cell resistance after storage [Ω(Ohm)]−initial cell resistance [Ω(Ohm)])/(initial cell resistance [Ω(Ohm)])}×100

Table 1 shows the measurement results. Note that in the items of the non-aqueous solvent in Table 1, the ratio in parenthesis indicates the mass ratio of each component constituting the non-aqueous solvent (this also applies to the following Tables 2 to 5).

TABLE 1

| | Electrolyte salt | Non-aqueous solvent | Compound A Kind | Compound A Content (% by mass) | Compound B Kind | Compound B Content (% by mass) | Resistance increase rate after 100 hours (%) |
|---|---|---|---|---|---|---|---|
| Example 1-1  | LiPF$_6$ | EC/PC/EMC/VC (39/39/20/2) | Formula (1-1) | 1 | — | — | 82 |
| Example 1-2  |          |                          | Formula (1-2) |   | — | — | 79 |
| Example 1-3  |          |                          | Formula (1-3) |   | — | — | 80 |
| Example 1-4  |          |                          | Formula (1-4) |   | — | — | 86 |
| Example 1-5  |          |                          | Formula (1-5) |   | — | — | 84 |
| Example 1-6  |          |                          | Formula (1-6) |   | — | — | 78 |
| Example 1-7  |          |                          | Formula (1-7) |   | — | — | 78 |
| Example 1-8  |          |                          | Formula (2-1) |   | — | — | 81 |
| Example 1-9  |          |                          | Formula (2-2) |   | — | — | 81 |
| Example 1-10 |          |                          | Formula (2-3) |   | — | — | 78 |
| Example 1-11 |          |                          | Formula (2-4) |   | — | — | 85 |
| Example 1-12 |          |                          | Formula (1-8) |   | — | — | 77 |
| Example 1-13 |          |                          | Formula (1-9) |   | — | — | 80 |
| Example 1-14 |          |                          | Formula (1-3) | 0.001 | — | — | 98 |
| Example 1-15 |          |                          |               | 0.01  | — | — | 85 |
| Example 1-16 |          |                          |               | 0.1   | — | — | 81 |
| Example 1-17 |          |                          |               | 5     | — | — | 80 |
| Example 1-18 |          |                          |               | 10    | — | — | 78 |
| Example 1-19 |          |                          |               | 30    | — | — | 90 |
| Example 1-20 |          |                          |               | 50    | — | — | 106 |
| Example 1-21 |          |                          |               | 1     | FEC | 1 | 74 |
| Example 1-22 |          |                          |               |       | 4MEC | 1 | 70 |
| Example 1-23 |          |                          |               |       | PS | 1 | 72 |
| Example 1-24 |          |                          |               |       | LiPF$_2$O$_2$ | 0.3 | 74 |
| Example 1-25 |          |                          |               |       | Li$_2$PFO$_3$ | 0.2 | 75 |

TABLE 1-continued

| | Electrolyte salt | Non-aqueous solvent | Compound A Kind | Compound A Content (% by mass) | Compound B Kind | Compound B Content (% by mass) | Resistance increase rate after 100 hours (%) |
|---|---|---|---|---|---|---|---|
| Example 1-26 | | | | | SN | 0.5 | 71 |
| Example 1-27 | | | | | AdpN | 0.5 | 74 |
| Example 1-28 | | | | | HMDI | 0.5 | 63 |
| Example 1-29 | | | | | Li[DfOB] | 1 | 73 |
| Example 1-30 | | EC/PC/EMC (40/40/20) | — | — | — | — | 90 |
| Example 1-31 | | EC/EMC (50/50) | — | — | — | — | 87 |
| Example 1-32 | | EC/EMC (30/70) | — | — | — | — | 88 |
| Comparative Example 1-1 | LiPF$_6$ | EC/PC/EMC/VC (39/39/20/2) | — | — | — | — | 127 |
| Comparative Example 1-2 | | | — | — | FEC | 1 | 129 |
| Comparative Example 1-3 | | | — | — | 4MEC | 1 | 125 |
| Comparative Example 1-4 | | | — | — | PS | 1 | 128 |
| Comparative Example 1-5 | | | — | — | LiPF$_2$O$_2$ | 0.3 | 123 |
| Comparative Example 1-6 | | | — | — | Li$_2$PFO$_3$ | 0.2 | 126 |
| Comparative Example 1-7 | | | — | — | SN | 0.5 | 122 |
| Comparative Example 1-8 | | | — | — | AdpN | 0.5 | 127 |
| Comparative Example 1-9 | | | — | — | HMDI | 0.5 | 118 |
| Comparative Example 1-10 | | | — | — | Li[DfOB] | 1 | 122 |

FEC: 4-fluoro-1,3-dioxolan-2-one,
4MEC: 4-methylene-1,3-dioxolan-2-one,
PS: 1,3-propane sultone,
SN: succinonitrile,
AdpN: adiponitrile,
HMDI: hexamethylene diisocyanate,
Li[DfOB]: lithium difluoro oxalate borate As shown in Table 1, in Examples 1-1 to 1-32, the resistance increase rate after 100 hours could be reduced.

Example 2-1

The amount of the positive electrode active material and the amount of the negative electrode active material were adjusted so that the open circuit voltage (i.e., the battery voltage) at the time of complete charge was 4.2 V. A laminated film type battery was produced similarly to Example 1-3 except for the above.

Comparative Example 2-1

In Comparative Example 2-1, a laminated film type battery was produced similarly to Example 2-1 except that the compound represented by the formula (1-3) was not added in the preparation of the electrolyte solution.

(Battery Evaluation: Measurement of Resistance Increase Rate after 100 Hours)

For each of the produced batteries, the resistance increase rate after 100 hours was measured as follows. Constant current and constant voltage charging was performed at 23° C. with a charging voltage of 4.2 V and a current of 0.2 C, and then stored in a charged state at 70° C. for 100 hours. In this operation, the resistance increase rate was obtained similarly to Example 1-1.

Table 2 shows the evaluation results.

TABLE 2

| | Electrolyte salt | Non-aqueous solvent | Compound A Kind | Compound A Content (% by mass) | Compound B Kind | Compound B Content (% by mass) | Resistance increase rate after 100 hours (%) |
|---|---|---|---|---|---|---|---|
| Example 2-1 | LiPF$_6$ | EC/PC/EMC/VC (39/39/20/2) | Formula (1-3) | 1 | — | — | 68 |
| Comparative Example 2-1 | LiPF$_6$ | EC/PC/EMC/VC (39/39/20/2) | — | — | — | — | 110 |

As shown in Table 2, in Example 2-1, the resistance increase rate after 100 hours could be reduced.

Example 3-1

As a negative electrode active material, a silicon carbon composite material was used. The amount of the positive electrode active material and the amount of the negative electrode active material were adjusted so that the open circuit voltage (i.e., the battery voltage) at the time of complete charge was 4.35 V. A laminated film type battery was produced similarly to Example 1-3 except for the above.

Comparative Example 3-1

In Comparative Example 3-1, a laminated film type battery was produced similarly to Example 3-1 except that the compound represented by the formula (1-3) was not added in the preparation of the electrolyte solution.

(Battery Evaluation: Measurement of Resistance Increase Rate after 100 Hours)

For each of the produced batteries, the resistance increase rate after 100 hours was measured similarly to Example 1-1. Constant current and constant voltage charging was performed at 23° C. with a charging voltage of 4.35 V and a current of 0.2 C, and then stored in a charged state at 70° C. for 100 hours. In this operation, the resistance increase rate was obtained similarly to Example 1-1.

Table 3 shows the evaluation results.

TABLE 3

| | Electrolyte salt | Non-aqueous solvent | Compound A Kind | Compound A Content (% by mass) | Compound B Kind | Compound B Content (% by mass) | Resistance increase rate after 100 hours (%) |
|---|---|---|---|---|---|---|---|
| Example 3-1 | LiPF$_6$ | EC/PC/EMC/VC (39/39/20/2) | Formula (1-3) | 1 | — | — | 83 |
| Comparative Example 3-1 | LiPF$_6$ | EC/PC/EMC/VC (39/39/20/2) | — | — | — | — | 141 |

As shown in Table 3, in Example 3-1, the resistance increase rate after 100 hours could be reduced.

Example 4-1

(Production of Coin Type Cell)
(Production of Positive Electrode)

A positive electrode active material layer was formed on both surfaces of a positive electrode current collector similarly to Example 1-1. This was punched into a circular shape having a diameter of 16 mm to form a positive electrode.

(Production of Negative Electrode)

A Li metal foil was punched out into a disk shape having a diameter of 16 mm to form a negative electrode.

A microporous film formed of polyethylene was prepared as a separator.

(Preparation of Non-Aqueous Electrolyte Solution)

A non-aqueous electrolyte similar to that of Example 1-3 was prepared.

(Assembly of Coin Type Cell)

The produced positive electrode and negative electrode were laminated via a separator, housed inside an exterior cup and an exterior can, and caulked through a gasket to produce a coin type non-aqueous electrolyte secondary battery (coin type cell) having a diameter of 20 mm and a height of 1.6 mm. Note that this coin type cell was designed to adjust the amount of the positive electrode active material and the amount of the negative electrode active material so that the open circuit voltage (i.e., the battery voltage) at the time of complete charge was 4.35 V.

Comparative Example 4-1

In Comparative Example 4-1, a coin type cell was produced similarly to Example 4-1 except that the compound represented by the formula (1-3) was not added in the preparation of the electrolyte solution.

(Battery Evaluation: Measurement of Resistance Increase Rate after 100 Hours)

For each of the produced batteries, the resistance increase rate after 100 hours was measured similarly to Example 1-1. Constant current and constant voltage charging was performed at 23° C. with a charging voltage of 4.35 V and a current of 0.2 C, and then stored in a charged state at 35° C. for 100 hours. In this operation, the resistance increase rate was obtained similarly to Example 1-1.

Table 4 shows the evaluation results.

TABLE 4

| | Electrolyte salt | Non-aqueous solvent | Compound A Kind | Compound A Content (% by mass) | Compound B Kind | Compound B Content (% by mass) | Resistance increase rate after 100 hours (%) |
|---|---|---|---|---|---|---|---|
| Example 4-1 | LiPF$_6$ | EC/PC/EMC/VC (39/39/20/2) | Formula (1-3) | 1 | — | — | 55 |
| Comparative Example 4-1 | LiPF$_6$ | EC/PC/EMC/VC (39/39/20/2) | — | — | — | — | 103 |

As shown in Table 4, in Example 4-1, the resistance increase rate after 100 hours could be reduced.

Example 5-1

(Production of Positive Electrode)

A positive electrode was produced similarly to Example 1-1.

(Production of Negative Electrode)

A negative electrode was prepared similarly to Example 1-1.

(Formation of Gel Electrolyte Layer)

A compound represented by the formula (1-3) was added to a non-aqueous solvent obtained by mixing ethylene carbonate (EC) and propylene carbonate (PC) at a mass ratio of 50:50, and then lithium hexafluorophosphate (LiPF$_6$) as an electrolyte salt was dissolved therein at a concentration of 1 mol/L, thereby preparing a non-aqueous electrolyte solution. Note that the content of the compound represented by the formula (1-3) was adjusted so as to be 1 mass % with respect to the total mass of the electrolyte solution.

Next, using a polyvinylidene fluoride (PVdF) as a polymer compound (resin material) for holding a non-aqueous electrolyte solution, the non-aqueous electrolyte solution, a polyvinylidene fluoride, and dimethyl carbonate (DMC) as a plasticizer were mixed to prepare a sol-like precursor solution.

Next, the precursor solution was applied to both surfaces of the positive electrode and the negative electrode, and dried to remove the plasticizer. As a result, a gel electrolyte layer was formed on the surfaces of the positive electrode and the negative electrode.

(Assembly of Laminated Film Type Battery)

The positive electrode and the negative electrode having a gel electrolyte layer formed on both surfaces, and a separator were laminated in the order of a positive electrode, a separator, a negative electrode, and a separator, and wound many times in the longitudinal direction to have a flat shape, and then, a wound electrode body was formed by fixing the winding end portion with an adhesive tape.

Next, the wound electrode body was sheathed with a laminated film, and the lead-out sides of the positive electrode lead and the negative electrode lead around the wound electrode body and the other two sides were sealed by thermal fusion under reduced pressure and hermetically sealed. In this way, a laminated film type battery shown in FIG. 3 was produced. Note that this laminated film type battery was designed to adjust the amount of the positive electrode active material and the amount of the negative electrode active material so that the open circuit voltage (i.e., the battery voltage) at the time of complete charge becomes 4.5 V.

Example 5-2

Alumina particles were added when preparing a sol-like precursor solution. At that time, the mass ratio of a polyvinylidene fluoride, a non-aqueous electrolyte solution, and alumina particles (polyvinylidene fluoride:non-aqueous electrolyte solution:alumina particles) was 10:90:10. A laminated film type battery was produced similarly to Example 5-1 except for the above.

Comparative Example 5-1

In Comparative Example 5-1, a laminated film type battery was produced similarly to Example 5-1 except that the compound represented by the formula (1-3) was not added in the preparation of the electrolyte solution.

Comparative Example 5-2

In Comparative Example 5-1, a laminated film type battery was produced similarly to Example 5-2 except that the compound represented by the formula (1-3) was not added in the preparation of the electrolyte solution.

(Battery Evaluation: Measurement of Resistance Increase Rate after 100 Hours)

For each of the produced batteries, the resistance increase rate after 100 hours was measured similarly to Example 1-1.

Table 5 shows the evaluation results.

As shown in Table 5, in Examples 5-1 to 5-2, the resistance increase rate after 100 hours could be reduced.

8. Other Embodiments

Although the present technology has been described heretofore by embodiments and examples, the present technology is not limited to the above-mentioned embodiments and examples, and various modifications can be made without departing from the essence of the present technology.

For example, numerical values, structures, shapes, materials, raw materials, production processes, and the like mentioned in the above-mentioned embodiments and examples are merely examples, and different numerical values, structures, shapes, materials, raw materials, production processes, and the like may be used as necessary.

The configurations, methods, steps, shapes, materials, numerical values, and the like of the above-mentioned embodiments and examples can be combined with each other as long as they do not depart from the essence of the present technology. For example, the non-aqueous electrolyte battery may be a primary battery.

The electrolyte according to the present technology can be similarly applied to those having other battery structures such as square type. In the second to fourth embodiments, a laminated electrode body may be used instead of the wound electrode body. For example, it is also applicable to a flexible battery or the like mounted on a wearable terminal such as a smart watch, a head-mounted display, and iGlass (registered trademark).

The separator may contain particles such as inorganic particles and organic particles. Examples of such a separator include a substrate and a substrate having a surface layer formed on at least one of both main surfaces of the substrate. The substrate is a porous film formed of a resin, a non-woven fabric, or the like. For example, the surface layer includes a polymer compound and particles. For example, the polymer compound may have a three-dimensional network structure in which fibrils are formed and the fibrils are continuously connected to each other.

It should be noted that the present technology may take the following configurations.

[1] An electrolyte, including an electrolyte solution containing a solvent, an electrolyte salt, and at least one of compounds represented by a formula (1) and a formula (2).

TABLE 5

| | Electrolyte salt | Non-aqueous solvent | Compound A Kind | Compound A Content (% by mass) | Insulating material Kind | Resistance increase rate after 100 hours (%) |
|---|---|---|---|---|---|---|
| Example 5-1 | LiPF$_6$ | EC/PC (50/50) | Formula (1-3) | 1 | — | 84 |
| Example 5-2 | | | | | Alumina | 71 |
| Comparative Example 5-1 | LiPF$_6$ | EC/PC (50/50) | — | — | — | 111 |
| Comparative Example 5-2 | | | | | Alumina | 105 |

[Chem. 21]

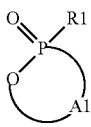
(1)

(In the formula (1), A1 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R1 represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

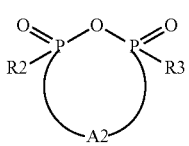
(2)

(In the formula (2), A2 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R2 and R3 each independently represent a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

[2] The electrolyte according to [1], in which
the content of the at least one of compounds represented by the formula (1) and the formula (2) is not less than 0.001% by mass and not more than 50% by mass with respect to a total mass of the electrolyte solution.

[3] The electrolyte according to [1] or [2], further including
at least one of a halogenated carbonic acid ester, an unsaturated cyclic carbonic acid ester, a sultone, a dinitrile compound, an isocyanate compound, a lithium difluorophosphate, a lithium monofluorophosphate, and a lithium difluoro oxalate borate.

[4] The electrolyte according to [3], in which
the halogenated carbonic acid ester is at least one of compounds represented by a formula (3),
the unsaturated cyclic carbonic acid ester is at least one of compounds represented by a formula (5),
the sultone is at least one of compounds represented by a formula (6),
the dinitrile compound is at least one of compounds represented by a formula (7), and
the isocyanate compound is hexamethylene diisocyanate.

[Chem. 22]

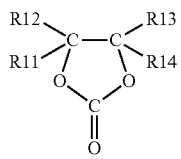
(3)

(in the formula (3), R11 to R14 each independently represent a hydrogen group, a halogen group, a monovalent hydrocarbon group, or a monovalent halogenated hydrocarbon group, and at least one of R11 to R14 is a halogen group or a monovalent halogenated hydrocarbon group.)

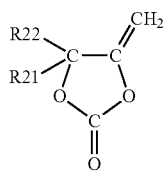
(5)

(in the formula (5), R21 and R22 each independently represent a hydrogen group, a halogen group, a monovalent hydrocarbon group, or a monovalent halogenated hydrocarbon group.)

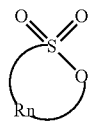
(6)

(in the formula (6), Rn is a divalent hydrocarbon group having n carbon atoms, a ring being formed by the divalent hydrocarbon group together with S (sulfur) and O (oxygen). N represents 2 to 5. The ring may contain an unsaturated double bond.)

NC—R31—CN (7)

(in the formula (7), R31 is a divalent hydrocarbon group or a divalent halogenated hydrocarbon group which may contain an oxygen atom or a sulfur atom.)

[5] The electrolyte according to any one of [1] to [4], further including:
a polymer compound holding the electrolyte solution; and particles.

[6] A battery, including:
a positive electrode;
a negative electrode; and
an electrolyte, in which
the electrolyte includes
an electrolyte solution containing
a solvent,
an electrolyte salt, and
at least one of compounds represented by a formula (1) and a formula (2).

[Chem. 23]

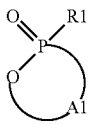
(1)

(In the formula (1), A1 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R1 represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

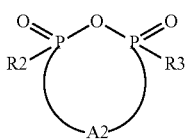
(2)

(In the formula (2), A2 represents a divalent saturated hydrocarbon group, a divalent unsaturated hydrocarbon group, a divalent halogenated saturated hydrocarbon group, or a divalent halogenated unsaturated hydrocarbon group, a ring being formed by the group together with O (oxygen) and P (phosphorus). R2 and R3 each independently represent a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group.)

[7] The battery according to [6], in which
the negative electrode contains, as a negative electrode active material, at least one of a simple substance of silicon, an alloy of silicon, a compound of silicon, and a lithium metal.

[8] The battery according to [6] or [7], in which
open circuit voltage in a fully charged state per pair of positive and negative electrodes is not less than 4.20 V and not more than 4.50 V.

[9] A battery pack, including:
the battery according to any one of [6] to [8];
a control unit that controls the battery; and
an exterior that houses the battery.

[10] An electronic apparatus, comprising the battery according to any one of [6] to [8], in which the electronic apparatus receives power supply from the battery.

[11] An electric vehicle, including:
the battery according to any one of [6] to [8];
a converting apparatus that receives supply of power from the battery and converts the received power into a driving force for the electric vehicle; and
a control apparatus that performs information processing relating to vehicle control on the basis of information on the battery.

[12] A power storage apparatus, including the battery according to any one of [6] to [8], wherein the power storage apparatus supplies power to an electronic apparatus connected to the battery.

[13] The power storage apparatus according to [12], further including
a power information control apparatus that transmits/receives a signal to/from another apparatus via a network, in which
the power storage apparatus controls, based on information received by the power information control apparatus, charge and discharge of the battery.

[14] A power system, that receives power supply from the battery according to any one of [6] to [8] or in which power is supplied from a power generation apparatus or a power network to the battery.

REFERENCE SIGNS LIST 11 battery can
12,13 insulating plate
14 battery lid
15A disc plate
15 safety valve mechanism
16 heat sensitive resistance element
17 gasket
20 wound electrode body
21 positive electrode
21A positive electrode current collector
21B positive electrode active material layer
22 negative electrode
22A negative electrode current collector
22B negative electrode active material layer
23 separator
24 center pin
25 positive electrode lead
26 negative electrode lead
30 wound electrode body
31 positive electrode lead
32 negative electrode lead
33 positive electrode
33A positive electrode current collector
33B positive electrode active material layer
34 negative electrode
34A negative electrode current collector
34B negative electrode active material layer
35 separator
36 electrolyte layer
37 protective tape
40 exterior member
41 adhesion film 41
211 power source
212 positive electrode lead
213 negative electrode lead
214, 215 tab
216 circuit board
217 lead with a connector
218, 219 adhesive tape
220 label 221 control unit
222 switch unit
224 temperature detection unit
225 positive electrode terminal
227 negative electrode terminal
231 insulating sheet
301 assembled battery
301a secondary battery
302a charge control switch
302b diode
303a discharge control switch
303b diode
304 switch unit
307 current detection resistor
308 temperature detection element
310 control unit
311 voltage detection unit
313 current measurement unit
314 switch control unit
317 memory
318 temperature detection unit
321 positive electrode terminal
322 negative electrode terminal
400 power storage system
401 house
402 centralized power system
402a thermal power generation
402b nuclear power generation
402c hydraulic power generation
403 power storage apparatus
404 power generation apparatus
405 power consumption apparatus
405a refrigerator
405b air conditioner
405c television receiver
405d bath
406 electric vehicle
406a electric automobile
406b hybrid car
406c electric motorcycle
407 smart meter
408 power hub
409 power network
410 control apparatus
411 sensor
412 information network
413 server
500 hybrid vehicle
501 engine
502 electric generator
503 electric power/driving force conversion apparatus
504a driving wheel
504b driving wheel
505a wheel
505b wheel
508 battery
509 vehicle control apparatus
510 sensor
511 charging port

The invention claimed is:

1. An electrolyte for a lithium-ion secondary battery, comprising:
a non-aqueous solvent,
an electrolyte salt, and
at least one of compounds represented by a formula (2),

[Chem. 1]

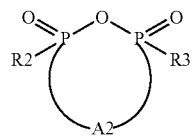

(2)

(in the formula (2), A2 represents a divalent saturated hydrocarbon group, a divalent unsaturated hydrocarbon group, a divalent halogenated saturated hydrocarbon group, or a divalent halogenated unsaturated hydrocarbon group, A2 has a number of carbon atoms from 3 to 5, a first ring being formed with A2, O (oxygen), and P (phosphorus) and R2 and R3 each independently represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group).

2. The electrolyte for the lithium-ion secondary battery according to claim 1, wherein
a content of the at least one of compounds represented by the formula (2) is not less than 0.001% by mass and not more than 50% by mass with respect to a total mass of the electrolyte.

3. The electrolyte for the lithium-ion secondary battery according to claim 1, further comprising:
at least one of a halogenated carbonic acid ester, an unsaturated cyclic carbonic acid ester, a sultone, a dinitrile compound, an isocyanate compound, a lithium difluorophosphate, a lithium monofluorophosphate, and a lithium difluoro oxalate borate.

4. The electrolyte for the lithium-ion secondary battery according to claim 3, wherein:
the halogenated carbonic acid ester is at least one of compounds represented by a formula (3),
the unsaturated cyclic carbonic acid ester is at least one of compounds represented by a formula (5),
the sultone is at least one of compounds represented by a formula (6),
the dinitrile compound is at least one of compounds represented by a formula (7), and
the isocyanate compound is hexamethylene diisocyanate,

[Chem. 2]

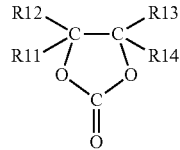

(3)

(in the formula (3), R11, R12, R13, and R14 each independently represents a hydrogen group, a halogen group, a monovalent hydrocarbon group, or a monovalent halogenated hydrocarbon group, and at least one of R11, R12, R13, and R14 is a halogen group or a monovalent halogenated hydrocarbon group),

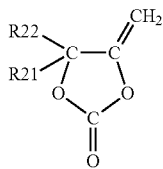
(5)

(in the formula (5), R21 and R22 each independently represents a hydrogen group, a halogen group, a monovalent hydrocarbon group, or a monovalent halogenated hydrocarbon group),

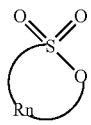
(6)

(in the formula (6), Rn is a divalent hydrocarbon group having n carbon atoms, a second ring being formed by the divalent hydrocarbon group together with S (sulfur) and O (oxygen), n represents 2 to 5, and the second ring contains an unsaturated double bond),

NC-R31-CN (7)

(in the formula (7), R31 is a divalent hydrocarbon group or a divalent halogenated hydrocarbon group which contains an oxygen atom or a sulfur atom).

5. The electrolyte for the lithium-ion secondary battery according to claim 1, further comprising:
a polymer compound; and
particles.

6. A lithium-ion secondary battery, comprising:
a positive electrode;
a negative electrode; and
an electrolyte, wherein
the electrolyte includes:
a non-aqueous solvent,
an electrolyte salt, and
at least one of compounds represented by a formula (2),

[Chem. 1]

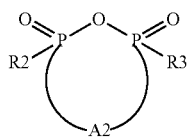
(2)

(in the formula (2), A2 represents a divalent saturated hydrocarbon group, a divalent unsaturated hydrocarbon group, a divalent halogenated saturated hydrocarbon group, or a divalent halogenated unsaturated hydrocarbon group, A2 has a number of carbon atoms from 3 to 5, a ring being formed with A2, O (oxygen), and P (phosphorus) and R2 and R3 each independently represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group).

7. The lithium-ion secondary battery according to claim 6, wherein
the negative electrode contains, as a negative electrode active material, at least one of a simple substance of silicon, an alloy of silicon, a compound of silicon, and a lithium metal.

8. The lithium-ion secondary battery according to claim 6, wherein
open circuit voltage in a fully charged state per pair of positive and negative electrodes is not less than 4.20 V and not more than 4.50 V.

9. A battery pack, comprising:
a lithium-ion secondary battery;
a control unit that controls the lithium-ion secondary battery; and
an exterior that houses the lithium-ion secondary battery, wherein the lithium-ion secondary battery includes:
a positive electrode,
a negative electrode, and
an electrolyte, wherein
the electrolyte includes:
a non-aqueous solvent,
an electrolyte salt, and
at least one of compounds represented by a formula (2),

[Chem. 1]

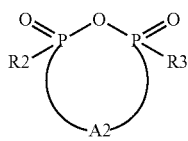
(2)

(in the formula (2), A2 represents a divalent saturated hydrocarbon group, a divalent unsaturated hydrocarbon group, a divalent halogenated saturated hydrocarbon group, or a divalent halogenated unsaturated hydrocarbon group, A2 has a number of carbon atoms from 3 to 5, a ring being formed with A2, O (oxygen), and P (phosphorus) and R2 and R3 each independently represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group).

10. An electronic apparatus, comprising a lithium-ion secondary battery, wherein:
the electronic apparatus receives power supply from the lithium-ion secondary battery, and
the lithium-ion secondary battery includes:
a positive electrode,
a negative electrode, and
an electrolyte, wherein
the electrolyte includes:
a non-aqueous solvent,
an electrolyte salt, and
at least one of compounds represented by a formula (2),

[Chem. 1]

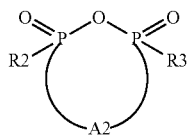

(2)

(in the formula (2), A2 represents a divalent saturated hydrocarbon group, a divalent unsaturated hydrocarbon group, a divalent halogenated saturated hydrocarbon group, or a divalent halogenated unsaturated hydrocarbon group, A2 has a number of carbon atoms from 3 to 5, a ring being formed with A2, O (oxygen), and P (phosphorus) and R2 and R3 each independently represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group).

11. An electric vehicle, comprising:
a lithium-ion secondary battery;
a converting apparatus that receives supply of power from the lithium-ion secondary battery and converts the received power into a driving force for the electric vehicle; and
a control apparatus that performs information processing relating to vehicle control based on information on the lithium-ion secondary battery,
wherein the lithium-ion secondary battery includes:
    a positive electrode,
    a negative electrode, and
    an electrolyte, wherein
    the electrolyte includes:
        a non-aqueous solvent,
        an electrolyte salt, and
        at least one of compounds represented by a formula (2),

[Chem. 1]

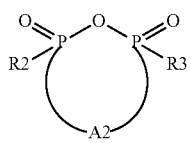

(2)

(in the formula (2), A2 represents a divalent saturated hydrocarbon group, a divalent unsaturated hydrocarbon group, a divalent halogenated saturated hydrocarbon group, or a divalent halogenated unsaturated hydrocarbon group, A2 has a number of carbon atoms from 3 to 5, a ring being formed with A2, O (oxygen), and P (phosphorus) and R2 and R3 each independently represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group).

12. A power storage apparatus, comprising a lithium-ion secondary battery, wherein:
the power storage apparatus supplies power to an electronic apparatus connected to the lithium-ion secondary battery, and
the lithium-ion secondary battery includes:
    a positive electrode,
    a negative electrode, and
    an electrolyte, wherein
    the electrolyte includes:
        a non-aqueous solvent,
        an electrolyte salt, and
        at least one of compounds represented by a formula (2),

[Chem. 1]

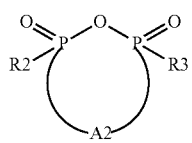

(2)

(in the formula (2), A2 represents a divalent saturated hydrocarbon group, a divalent unsaturated hydrocarbon group, a divalent halogenated saturated hydrocarbon group, or a divalent halogenated unsaturated hydrocarbon group, A2 has a number of carbon atoms from 3 to 5, a ring being formed with A2, O (oxygen), and P (phosphorus) and R2 and R3 each independently represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group).

13. The power storage apparatus according to claim 12, further comprising:
a power information control apparatus that transmits/receives a signal to/from another apparatus via a network,
wherein the power storage apparatus controls, based on information received by the power information control apparatus, charge and discharge of the lithium-ion secondary battery.

14. A power system, comprising:
circuitry that receives power supply from a lithium-ion secondary battery, or supplies power from a power generation apparatus or a power network to the lithium-ion secondary battery,
wherein the lithium-ion secondary battery includes:
    a positive electrode,
    a negative electrode, and
    an electrolyte, wherein
    the electrolyte includes:
        a non-aqueous solvent,
        an electrolyte salt, and
        at least one of compounds represented by a formula (2),

[Chem. 1]

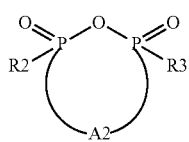
(2)

(in the formula (2), A2 represents a divalent saturated hydrocarbon group, a divalent unsaturated hydrocarbon group, a divalent halogenated saturated hydrocarbon group, or a divalent halogenated unsaturated hydrocarbon group, A2 has a number of carbon atoms from 3 to 5, a ring being formed with A2, O (oxygen), and P (phosphorus) and R2 and R3 each independently represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group).

15. The electrolyte for the lithium-ion secondary battery according to claim 1, further comprising:
at least one of compounds represented by a formula (1),

[Chem. 3]

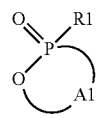
(1)

(in the formula (1), A1 represents a divalent saturated hydrocarbon group, a divalent unsaturated hydrocarbon group, a divalent halogenated saturated hydrocarbon group, or a divalent halogenated unsaturated hydrocarbon group, A1 has a number of carbon atoms from 3 to 5, a third ring being formed with A1, O (oxygen), and P (phosphorus) and R1 represents a monovalent saturated hydrocarbon group, a monovalent unsaturated hydrocarbon group, a monovalent aromatic hydrocarbon group, a monovalent halogenated saturated hydrocarbon group, a monovalent halogenated unsaturated hydrocarbon group, or a monovalent halogenated aromatic hydrocarbon group).

\* \* \* \* \*